US012804394B2

(12) United States Patent
Jiang et al.

(10) Patent No.: US 12,804,394 B2

(45) Date of Patent: Nov. 17, 2026

(54) COLLABORATIVE VERIFICATION METHODS, COLLABORATIVE AUTHENTICATION METHOD, OPERATOR DEVICE AND ENTERPRISE DEVICE

(71) Applicant: ZTE CORPORATION, Shenzhen (CN)

(72) Inventors: Zhihong Jiang, Shenzhen (CN); Xincheng Yan, Shenzhen (CN); Na Zhou, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 80 days.

(21) Appl. No.: 18/880,900

(22) PCT Filed: Jun. 6, 2023

(86) PCT No.: PCT/CN2023/098614

§ 371 (c)(1), (2) Date: Jan. 3, 2025

(87) PCT Pub. No.: WO2024/007803

PCT Pub. Date: Jan. 11, 2024

(65) Prior Publication Data

US 2026/0006439 A1 Jan. 1, 2026

(30) Foreign Application Priority Data

Jul. 4, 2022 (CN) ........................ 202210780513.3

(51) Int. Cl.
*H04W 12/06* (2021.01)

(52) U.S. Cl.
CPC .................................. *H04W 12/06* (2013.01)

(58) Field of Classification Search
CPC .................................................... H04W 12/06
USPC ............................................................ 726/6
See application file for complete search history.

(56) References Cited

U.S. PATENT DOCUMENTS

2023/0027152 A1* 1/2023 Doshi ................ H04L 41/0672

FOREIGN PATENT DOCUMENTS

| | | | |
|---|---|---|---|
| CN | 101453476 | A | 6/2009 |
| CN | 102340487 | A | 2/2012 |
| CN | 111835528 | A | 10/2020 |
| CN | 114553480 | A | 5/2022 |

(Continued)

OTHER PUBLICATIONS

Machine Language translation of CN101453476 A by the EPO. The original Application is cited on Applicants IDS (Year: 2009).*

(Continued)

*Primary Examiner* — Michael S McNally

(74) *Attorney, Agent, or Firm* — Vivacqua Crane, PLLC

(57) ABSTRACT

A collaborative verification method, a collaborative authentication method, an operator device, an enterprise device, a terminal device, a relay device, and a storage medium are disclosed. The collaborative verification method may include: establishing a first trust collaboration relationship with a second trust domain; and acquiring an access request sent by a terminal device, and performing access verification on the terminal device according to the first trust collaboration relationship and the access request, such that related information verification of the second trust domain is implemented in the first trust domain.

10 Claims, 12 Drawing Sheets

(56) References Cited

FOREIGN PATENT DOCUMENTS

| | | |
|---|---|---|
| CN | 114553527 A | 5/2022 |

OTHER PUBLICATIONS

International Searching Authority. International Search Report and Written Opinion for PCT Application No. PCT/CN2023/098614 and English translation, mailed Sep. 6, 2023, pp. 1-10.

* cited by examiner

COLLABORATIVE VERIFICATION METHODS, COLLABORATIVE AUTHENTICATION METHOD, OPERATOR DEVICE AND ENTERPRISE DEVICE

CROSS-REFERENCE TO RELATED APPLICATION

This application is a national stage filing under 35 U.S.C. § 371 of international application number PCT/CN2023/098614, filed Jun. 6, 2023, which claims priority to Chinese patent application No. 202210780513.3, filed Jul. 4, 2022. The contents of these applications are incorporated herein by reference in their entirety.

TECHNICAL FIELD

Embodiments of the present disclosure relate to the field of network communication security, and more particularly, to a collaborative verification method, a collaborative authentication method, an operator device, an enterprise device, a terminal device, a relay device, and a storage medium.

BACKGROUND

The basis of network access control is trust. In conventional mobile networks, the network side (e.g., an operator network) performs access authentication on a user terminal device, and serves as a pipeline to carry the service authentication between the user terminal device and the service side. The user terminal device and the network side constitute a binary trust model. An independent identity authentication is performed on the user terminal device respectively at the network side and the server side (e.g., an enterprise side). For example, a network system authenticates the user terminal device and the server side authenticates the user terminal device.

Currently, in an attack defense mechanism based on the binary trust model, when a user terminal device requests to access a resource, the network side and the server side separately verify the access request from the user terminal device. Such a verification method cannot achieve near-source detection of and protection against malicious attacks during resource access, resulting in degraded security of the server side. Therefore, how to improve the security of the server side is an urgent issue to be discussed and addressed.

SUMMARY

Embodiments of the present disclosure provide a collaborative verification method, a collaborative authentication method, an operator device, an enterprise device, a terminal device, a relay device, and a storage medium.

In accordance with a first aspect of the present disclosure, an embodiment provides a collaborative verification method, applied to a first trust domain, the method including: establishing a first trust collaboration relationship with a second trust domain; and acquiring an access request sent by a terminal device, and performing access verification on the terminal device according to the first trust collaboration relationship and the access request, such that related information verification of the second trust domain is implemented in the first trust domain.

In accordance with a second aspect of the present disclosure, an embodiment provides a collaborative authentication method, applied to a second trust domain, the method including: establishing a second trust collaboration relationship with at least one first trust domain; performing access authentication on a terminal device to obtain a second authentication result and establishing a second trust relationship with the terminal device according to the second authentication result; and sending second trust credential information to the terminal device according to the second trust relationship and the second trust collaboration relationship, where the second trust credential information is used for the first trust domain to implement related information verification of the second trust domain.

In accordance with a third aspect of the present disclosure, an embodiment provides a collaborative verification method, applied to a terminal device, the method including: sending an access request to a first trust domain, where the access request carries information of the terminal device, target resource information, trust domain information, and to-be-verified credential information, where the to-be-verified credential information is obtained according to second trust credential information sent by a second trust domain or the first trust domain, the second trust credential information is obtained according to second verification information generated by the first trust domain, and the second verification information is generated by the first trust domain after a trust collaboration relationship is established between the first trust domain and the second trust domain.

In accordance with a fourth aspect of the present disclosure, an embodiment provides a collaborative verification method, applied to a relay network, the method including: establishing a third trust collaboration relationship with a first trust domain; establishing a fourth trust collaboration relationship with a second trust domain according to the third trust collaboration relationship; acquiring an access request sent by the first trust domain, where the access request is forwarded after the first trust domain implements related information verification of the relay device; and verifying the terminal device according to the second trust collaboration relationship and the access request.

In accordance with a fifth aspect of the present disclosure, an embodiment provides an operator device, including a memory and a processor, where the memory is configured for storing a program which, when read and executed by the processor, causes the processor to implement the collaborative verification method in accordance with the first aspect.

In accordance with a sixth aspect of the present disclosure, an embodiment provides an enterprise device, including a memory and a processor, where the memory is configured for storing a program which, when read and executed by the processor, causes the processor to implement the collaborative authentication method in accordance with the second aspect.

In accordance with a seventh aspect of the present disclosure, an embodiment provides a terminal device, including a memory and a processor, where the memory is configured for storing a program which, when read and executed by the processor, causes the processor to implement the collaborative verification method in accordance with the third aspect.

In accordance with an eighth aspect of the present disclosure, an embodiment provides a relay device, including a memory and a processor, where the memory is configured for storing a program which, when read and executed by the processor, causes the processor to implement the collaborative verification method in accordance with the fourth aspect.

In accordance with a ninth aspect of the present disclosure, an embodiment provides a computer storage medium, including a computer program or computer instructions which, when read from the computer-readable storage medium and executed by a processor of a computer device, causes the computer device to implement the collaborative verification method in accordance with the first aspect, the third aspect, or the fourth aspect, or implement the collaborative authentication method in accordance with the second aspect.

DETAILED DESCRIPTION

Figure 1:
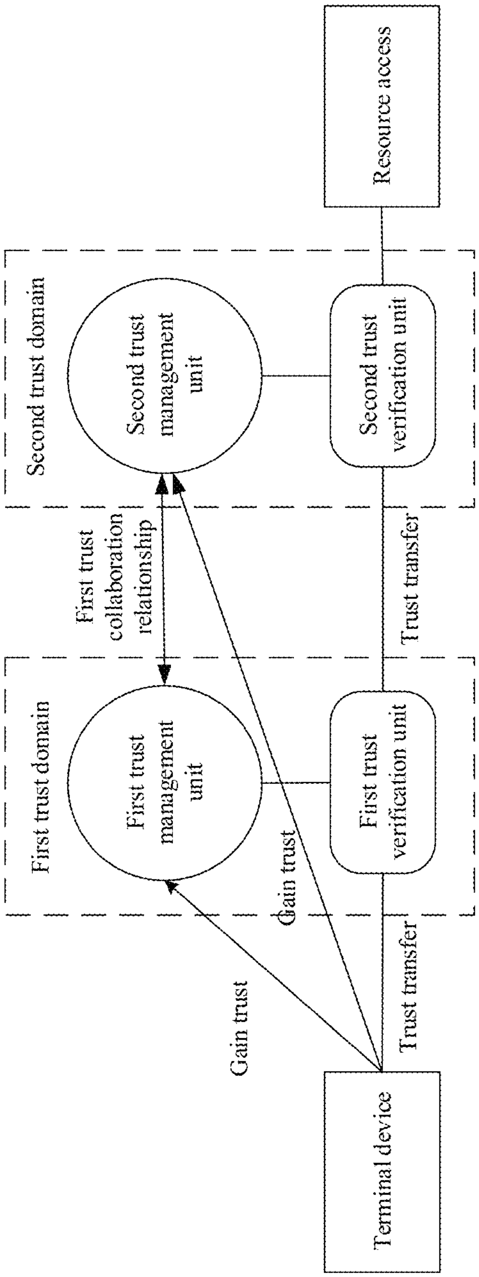
FIG. 1 is a schematic diagram of an application scenario of a collaborative verification method according to an embodiment of the present disclosure.

It is to be noted, although functional modules have been divided in the schematic diagrams of apparatuses and logical orders have been shown in the flowcharts, in some cases, the modules may be divided in a different manner, or the steps shown or described may be executed in an order different from the orders as shown in the flowcharts. The terms such as "first", "second" and the like in the description, the claims, and the accompanying drawings are used to distinguish similar objects, and are not necessarily used to describe a specific sequence or a precedence order.

In the description of the embodiments of the present disclosure, unless otherwise explicitly defined, the terms such as "configure", "install/mount" and "connect" should be understood in a broad sense, and those having ordinary skills in the art can reasonably determine the specific meanings of the above terms in the embodiments of the present disclosure based on the specific contents of the technical schemes. In the embodiments of the present disclosure, any embodiment or design described following the terms such as "in an embodiment," "in some embodiments," and "for example" is used to indicate examples, explanations, or illustrations, and should not be construed as being superior or advantageous over other embodiments or designs. The use of the terms such as "in an embodiment," "in some embodiments," and "for example" is intended to present the relevant concepts in a concrete manner.

The basis of network access control is trust. In conventional mobile networks, the network side (e.g., an operator network) performs access authentication on a user terminal device, and serves as a pipeline to carry the service authentication between the user terminal device and the service side. The user terminal device and the network side constitute a binary trust model. An independent identity authentication is performed on the user terminal device respectively at the network side and the server side (e.g., an enterprise side). For example, a network system authenticates the user terminal device and the server side authenticates the user terminal device.

At present, in an attack defense mechanism based on the binary trust model, when a user terminal device requests to access a resource, the network side and the server side separately verify the access request from the user terminal device. Such a verification method cannot achieve near-source detection of and protection against malicious attacks during resource access, resulting in degraded security of the server side.

In view of the above, embodiments of the present disclosure provide a collaborative verification method, a collaborative authentication method, an operator device, an enterprise device, a terminal device, a relay device, and a storage medium. A trust collaboration relationship is established between a second trust domain and a first trust domain, the first trust domain and the second trust domain respectively establish a trust relationship with a terminal device to establish a trust transfer mechanism between the terminal device, the first trust domain, and the second trust domain. When the terminal device accesses a target resource, the first trust domain verifies the terminal device, the first trust domain implements related information verification of the second trust domain and then forwards an access request to the second trust domain, and the second trust domain verifies the terminal device. In this process, the first trust domain implements the related information verification of the second trust domain during verifying the terminal device, to achieve near-source detection of and protection against attacks, thereby improving the security of the second trust domain.

The embodiments of the present disclosure are applied to a first trust domain, a second trust domain, a third trust domain, and/or a terminal device. The first trust domain may be an operator network. The second trust domain may be an enterprise network. The third trust domain may be a relay network. The terminal device may be a mobile phone, a tablet personal computer, a laptop computer, a Personal Digital Assistant (PDA), a handheld computer, a netbook, an ultra-mobile personal computer (UMPC), a Mobile Internet Device (MID), a wearable device, a Vehicular User Equipment (VUE), a Pedestrian User Equipment (PUE), or other terminal device-side devices. The wearable device includes a band, a headphone, glasses, etc. It should be noted that the type of the terminal device is not limited in the embodiments of the present disclosure.

FIG. 1 is a schematic diagram of an application scenario including a first trust domain, a second trust domain, and a terminal device according to an embodiment of the present disclosure. As shown in FIG. 1, a trust transfer mechanism is established between the first trust domain, the second trust domain, and the terminal device, and a first collaboration relationship is established between the first trust domain and the second trust domain, such that a result of authentication on the terminal device is shared among different systems, thus changing a conventional binary trust model into a multi-party trust model. In some embodiments, the first trust domain establishes a first trust collaboration relationship with the second trust domain, the terminal device sends authentication request information to the first trust domain to gain trust from the first trust domain, and the terminal device sends second authentication request information to the second trust domain to gain trust from the second trust domain. As such, a trust transfer mechanism is established between the terminal device, the first trust domain, and the second trust domain, and when the terminal device accesses a target resource, the first trust domain verifies the terminal device first, the first trust domain implements related information verification of the second trust domain and then forwards an access request to the second trust domain, and the second trust domain verifies the terminal device. In this process, the first trust domain implements the related information verification of the second trust domain during verifying the terminal device, to achieve near-source detection of and protection against attacks, thereby improving the security of the second trust domain. In addition, the data processing burden of the second trust domain in verifying the terminal device is reduced, thereby improving the data processing efficiency of verification by the service side.

In another embodiment, only the first trust domain needs to verify the access request of the terminal device, the second trust domain does not need to verify the access request of the terminal device, and after the first trust domain verifies the access request of the terminal device, the terminal device is allowed to access the target resource. As such, the data processing burden of the second trust domain is reduced while achieving near-source detection of and protection against attacks.

Figure 2:
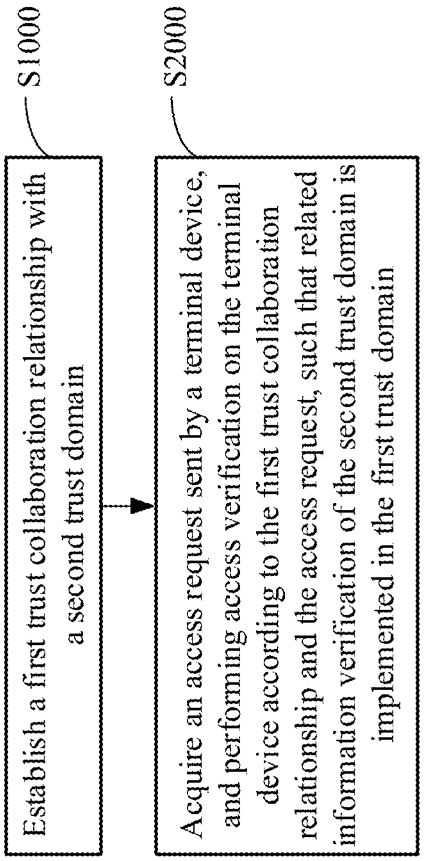
FIG. 2 is a schematic flowchart of a collaborative verification method according to an embodiment of the present disclosure.

FIG. 2 is a schematic flowchart of a collaborative verification method according to an embodiment of the present disclosure. As shown in FIG. 2, the collaborative verification method is applied to a first trust domain and at least includes, but not limited to, the following steps S1000 to S2000.

At S1000, a first trust collaboration relationship is established with a second trust domain.

At S2000, an access request sent by a terminal device is acquired, and access verification is performed on the terminal device according to the first trust collaboration relationship and the access request, such that related information verification of the second trust domain is implemented in the first trust domain.

It should be noted that the first trust domain may be an access network, such as an operator network, and the second trust domain may be a service network, such as an enterprise network. With the development of communication technologies, the first trust domain and the second trust domain in this embodiment are not limited to being in an access network and a core network, and may be adjusted along with network upgrades. For example, the first trust domain and the second trust domain are both in a core network, the first trust domain being at a first level, and the second trust domain being at a second level.

In some embodiments, the number of first trust domains is one. The second trust domain generates second verification information in the process of establishing the first trust collaboration relationship with the first trust domain. When the terminal device accesses the second trust domain, the second trust domain performs access authentication on the terminal device, and generates second trust credential information according to identity information of the terminal device and the second verification information. It should be noted that the second trust credential information is generated by the second trust domain.

In some embodiments, there are a plurality of first trust domains, and in the process of the second trust domain performing access authentication on the terminal device, the second trust domain acquires a first trust domain identifier of a first trust domain sent by the terminal device, and obtains corresponding second verification information according to the first trust domain identifier. The second verification information may be generated by the first trust domain. The second verification information may be a key, a verification code, a token, a ticket, or etc.

In some embodiments, there are a plurality of first trust domains, and in the process of the second trust domain performing access authentication on the terminal device, the second trust domain does not acquire a second trust domain identifier of the second trust domain sent by the terminal device. The second trust domain obtains an authentication request sent by the terminal device, acquires a previous hop address of the authentication request, identifies a target trust domain from the plurality of first trust domains according to the previous hop address, adds identification information of the target trust domain to the authentication request sent by the terminal device, and obtains corresponding second verification information according to the identification information of the target trust domain. The second verification information may be generated by the first trust domain. The second verification information may be a key, a verification code, a token, a ticket, or etc.

In some embodiments, the process of establishing the first trust collaboration relationship with the second trust domain by the first trust domain may be performed prior to the access authentication on the terminal device.

In some embodiments, the process of establishing the first trust collaboration relationship with the second trust domain by the first trust domain may be performed during the access authentication on the terminal device, and the second trust domain needs to acquire related information of the terminal device in the first trust domain, for example, access location information and terminal device type information.

In some embodiments, the first trust domain and the second trust domain may respectively establish a trust collaboration relationship with a relay trust domain, to form the first trust collaboration relationship between the first trust domain and the second trust domain through trust transfer.

In some embodiments, the target resource accessed by the terminal device may be a service or a slice, and the first trust domain and the second trust domain need to verify an identifier of the service or the slice accessed by the terminal device. Therefore, when the terminal establishes a second trust relationship with the second trust domain, the terminal device needs to establish a second trust relationship with the second trust domain according to the identifier of the service or the slice. It should be noted that a service or a slice has a smaller "granularity" than an enterprise network and can provide a more refined and customized service. Therefore, when a terminal device accesses a service or a slice, it is necessary to verify an identifier of the service or the slice.

In some embodiments, because the first trust collaboration relationship has been established between the first trust domain and the second trust domain, access authentication is performed on the terminal device only once, i.e., the first trust domain performs access authentication on the terminal device, and the second trust domain does not need to perform access authentication on the terminal device. In some embodiments, when the first trust domain establishes the first trust collaboration relationship with the second trust domain, the first trust domain generates second verification information corresponding to the second trust domain, and when the first trust domain performs access authentication on the terminal device, the first trust domain may generate second trust credential information according to a preset trust relationship and the second verification information. It should be noted that the second trust credential information is generated by the first trust domain.

In some embodiments, S1000 at least includes the following steps S1100, S1200, and S1300.

At S1100, a trust collaboration request sent by the second trust domain is received.

At S1200, a trust collaboration result is obtained according to a preset trust relationship and the trust collaboration request.

At S1300, trust collaboration confirmation information is sent to the second trust domain according to the trust collaboration result to establish the first trust collaboration relationship with the second trust domain, where the trust collaboration confirmation information includes second verification information.

It should be noted that first verification information and the second verification information in this embodiment may each be a key, an authentication code, a token, a ticket, etc. The first trust domain first receives a trust collaboration request sent by the second trust domain, performs trust collaboration authentication with the second trust domain according to a preset trust relationship and the trust collaboration request sent by the second trust domain to obtain a trust collaboration result, and sends collaboration confirmation information to the second trust domain according to the trust collaboration result to establish the first trust collaboration relationship with the second trust domain. When the terminal device accesses the target resource, the first trust domain and the second trust domain respectively verify the access request of the terminal device.

Figure 3:
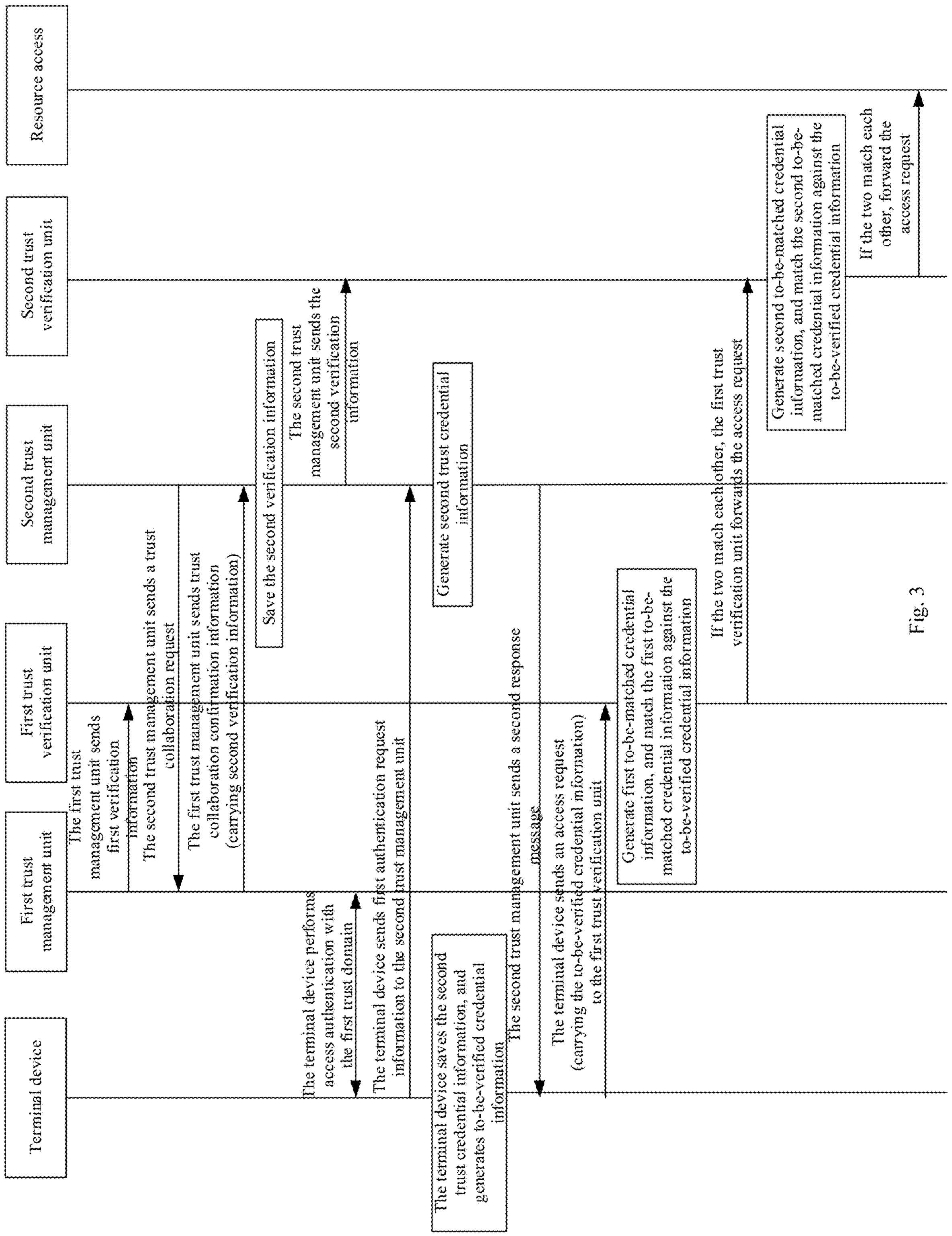
FIG. 3 is a schematic flowchart of a collaborative verification method according to an embodiment of the present disclosure.

FIG. 3 is a schematic flowchart of a collaborative verification method according to an embodiment of the present disclosure. As shown in FIG. 3, in some embodiments, the process of establishing the first trust collaboration relationship with the second trust domain by the first trust domain may be performed prior to the access authentication on the terminal device.

In some embodiments, the first trust domain includes a first trust management unit and a first trust verification unit, the second trust domain includes a second trust management unit and a second trust verification unit, and the first trust management unit, after being started, sends first verification information to the first trust verification unit. The first trust domain may be an operator network, the first trust management unit may be an operator server (e.g., an operator authentication server or an operator key server), and the first trust verification unit may be an operator gateway. The second trust domain may be an enterprise network, the second trust management unit may be an enterprise server (e.g., an enterprise authentication server or an enterprise key server), and the second trust verification unit may be an enterprise gateway.

The first trust domain performs trust collaboration authentication with the second trust domain. In some embodiments, the second trust management unit, after being started, sends a trust collaboration request to the first trust management unit; the first trust management unit determines according to a preset trust relationship between the first trust domain and the second trust domain that the first trust domain and the second trust domain can establish a trust collaboration relationship, generates second verification information, and sends collaboration confirmation information including the second verification information to the second trust management unit; and the second trust management unit receives the second verification information and synchronizes the second verification information to the second trust authentication unit. The trust collaboration request includes an identifier of the second trust domain.

The terminal device performs access authentication with the first trust domain. In some embodiments, the terminal device sends first authentication request information to the first trust management unit of the first trust domain, and the first trust management unit determines according to the first authentication request information whether the current access by the terminal device is allowed, and if yes, sends a first response message to the terminal device, thus completing the access authentication on the terminal device by the first trust domain, and establishing a first trust relationship between the first trust domain and the terminal device. The first response message includes first trust credential information.

The terminal device performs access authentication with the second trust domain. In some embodiments, the terminal device sends second authentication request information to the second trust management unit of the second trust domain, and requests the second trust domain to authenticate the terminal device; and the second trust management unit authenticates the terminal device, generates second trust credential information, and sends a second response message to the terminal device, thus completing the access authentication on the terminal device by the second trust domain, and establishing a second trust relationship between the second trust domain and the terminal device. The terminal device receives the second response message sent by the second trust domain. The second response message includes the second trust credential information and an identifier of the second trust domain.

The terminal device accesses a target resource, generates to-be-verified credential information according to the second response message, and sends an access request to the first trust domain according to the to-be-verified credential information. The first trust verification unit of the first trust domain receives the access request, generates first to-be-matched credential information according to identification information of the terminal device and the identifier of the second trust domain in the access request, locally stored first verification information, and the like, and matches the first to-be-matched credential information against the to-be-verified credential information. If the to-be-verified credential information matches the first to-be-matched credential information, the first trust verification unit of the first trust domain sends the access request sent by the terminal device to the second trust domain. If the to-be-verified credential information does not match the first to-be-matched credential information, the first trust verification unit of the first trust domain rejects the access request or lowers a forwarding priority of the access request.

The second trust verification unit of the second trust domain receives the access request, generates second to-be-matched credential information according to the identification information of the terminal device in the access request and locally stored second verification information, and matches the second to-be-matched credential information against the to-be-verified credential information. If the to-be-verified credential information matches the second to-be-matched credential information, the second trust verification unit forwards the access request to the target resource. If the to-be-verified credential information does not match the second to-be-matched credential information, the second trust verification unit rejects the access request or lowers a forwarding priority of the access request.

Figure 4:
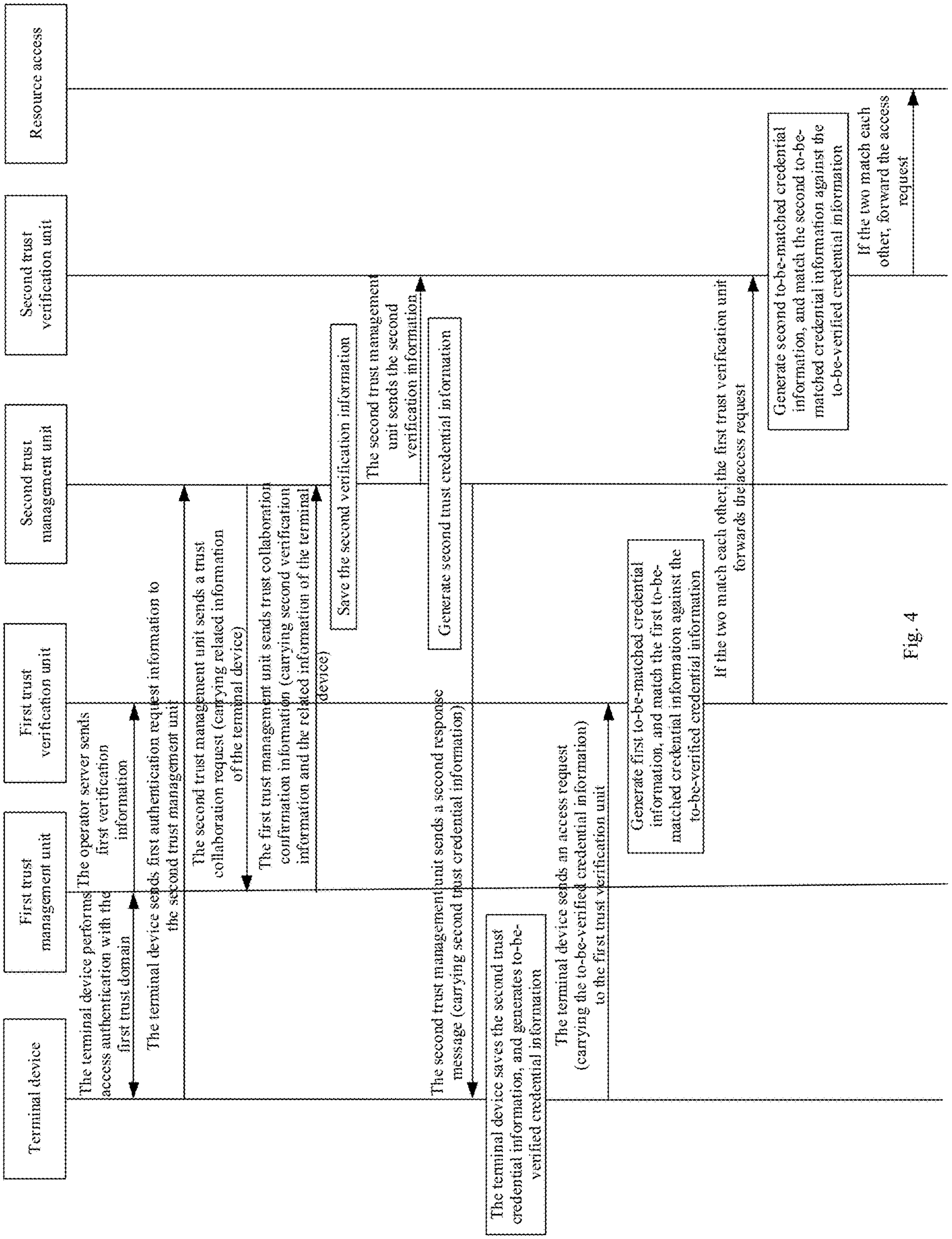
FIG. 4 is a schematic flowchart of a collaborative verification method according to an embodiment of the present disclosure.

FIG. 4 is a schematic flowchart of a collaborative verification method according to an embodiment of the present disclosure. As shown in FIG. 4, in some embodiments, the process of establishing the first trust collaboration relationship with the second trust domain by the first trust domain may be performed during the access authentication on the terminal device.

In some embodiments, S1000 at least includes the following steps S1400, S1500, and S1600.

At S1400, a trust collaboration request sent by the second trust domain is received.

At S1500, a trust collaboration result is obtained according to a preset trust relationship, the trust collaboration request, and related information of the terminal.

At S1600, trust collaboration confirmation information is sent to the second trust domain according to the trust collaboration result, where the trust collaboration confirmation information includes the related information of the terminal device and second verification information.

It should be noted that because the collaboration authentication of the first trust domain and the second trust domain may be performed between the access authentication on the terminal device by the first trust domain and the access authentication on the terminal device by the second trust domain, the second trust domain sends a trust collaboration request to the first trust domain in the process of establishing the first trust collaboration relationship with the second trust domain by the first trust domain, where the trust collaboration request includes related information of the terminal device. The first trust domain performs trust collaboration authentication with the second trust domain according to the trust collaboration request, a preset trust relationship and the related information of the terminal device to obtain a trust collaboration result, and sends collaboration confirmation information to the second trust domain according to the trust collaboration result to establish the first trust collaboration relationship with the second trust domain. When the terminal device accesses the target resource, the first trust domain and the second trust domain respectively verify the access request of the terminal device.

In some embodiments, the terminal device performs access authentication with the first trust domain. In some embodiments, the terminal device sends first authentication request information to the first trust management unit of the first trust domain, and the first trust management unit determines according to the first authentication request information whether the current access by the terminal device is allowed, and if yes, sends a first response message to the terminal device, thus completing the access authentication on the terminal device by the first trust domain, and establishing a first trust relationship between the first trust domain and the terminal device. The first response message includes first trust credential information.

The terminal device sends second authentication request information to the second trust management unit of the second trust domain, and requests the second trust domain to authenticate the terminal device. The second trust management unit of the second trust domain receives the second authentication request information, and sends a trust collaboration request to the first trust management unit of the first trust domain, where the trust collaboration request includes related information of the terminal device and a second trust domain identifier of the second trust domain. The first trust management unit receives the trust collaboration request, queries the related information of the terminal device (e.g., access location information, terminal device type information, and terminal device identity information) according to a preset trust relationship and identity information of the terminal device, generates second verification information, and sends trust collaboration confirmation information to the second trust management unit, where the trust collaboration confirmation information includes the related information of the terminal device, the second verification information, etc. The second trust management unit receives the trust collaboration confirmation information, and determines according to the related information of the terminal device whether the terminal device satisfies an authentication condition. If the terminal device satisfies the authentication condition, it indicates that a second authentication result of the access authentication on the terminal device by the second trust domain is an authentication success result, and the second trust domain can establish a second trust relationship with the terminal device. In this case, the second trust management unit generates second trust credential information according to the terminal device identity information and the second verification information, and sends a second response message to the terminal device, thus completing the access authentication on the terminal device by the second trust domain, and establishing a second trust relationship between the second trust domain and the terminal device. The terminal device receives the second response message sent by the second trust domain. The second response message includes the second trust credential information and an identifier of the second trust domain.

The terminal device accesses a target resource, generates to-be-verified credential information according to the second response message, and sends an access request to the first trust domain according to the to-be-verified credential information. The first trust verification unit of the first trust domain receives the access request, generates first to-be-matched credential information according to identification information of the terminal device and the identifier of the second trust domain in the access request, locally stored first verification information, and the like, and matches the first to-be-matched credential information against the to-be-verified credential information. If the to-be-verified credential information matches the first to-be-matched credential information, the first trust verification unit of the first trust domain sends the access request sent by the terminal device to the second trust domain. If the to-be-verified credential information does not match the first to-be-matched credential information, the first trust verification unit of the first trust domain rejects the access request or lowers a forwarding priority of the access request. The second trust domain verifies the to-be-verified credential information according to the terminal device identity information and the second verification information. The second response message includes the second trust credential information and the terminal device identity information.

In some embodiments, there are a plurality of first trust domains, the second trust domain may connect to the plurality of first trust domains by using different second trust domain identifiers, the second trust domain respectively establishes a trust collaboration relationship with different first trust domains, and the plurality of first trust domains generate different second verification information for the same second trust domain. When the terminal device performs authentication with the second trust domain, the second authentication request sent by the terminal device to the second trust domain includes a first trust domain identifier of a first trust domain, and the second trust domain selects corresponding second verification information according to the first trust domain identifier and generates second trust credential information. The terminal device generates to-be-verified credential information according to the second trust credential information and the terminal device identity information. When the terminal device accesses the target resource, the first trust domain verifies the to-be-verified credential information according to the terminal device identity information, the second trust domain identifier, and the first verification information, and if the verification is successful, sends the access request to the second trust domain. The second trust domain verifies the to-be-verified credential information according to the terminal device identity information and the second verification information.

In some embodiments, there are a plurality of first trust domains, the second trust domain respectively establishes a trust collaboration relationship with different first trust domains by using the same second trust domain identifier, and the plurality of first trust domains respectively generate different second verification information for the same second trust domain. When the terminal device performs authentication with the second trust domain, the second authentication request sent by the terminal device to the second trust domain does not include the first trust domain identifier of the first trust domain, a corresponding target trust domain is identified according to an address of the first trust domain connected to the second trust management unit of the second trust domain, identification information of the target trust domain is obtained, and the second trust domain selects corresponding second verification information according to the identification information of the target trust domain and generates second trust credential information. The terminal device generates to-be-verified credential information according to the second trust credential information and the terminal device identity information. When the terminal device accesses the target resource, the first trust domain verifies the to-be-verified credential information according to the terminal device identity information, the second trust domain identifier, and the first verification information, and if the verification is successful, sends the access request to the second trust domain. The second trust domain verifies the to-be-verified credential information according to the terminal device identity information and the second verification information.

In some embodiments, under a more refined requirement for security protection, the second trust domain needs to perform verification based on a service identifier or a slice identifier of the service, and the terminal device needs to identify the service identifier or the slice identifier in the access request, the second trust domain performs access authentication on the terminal device, and the service identifier or the slice identifier is carried in the access request. Therefore, the second authentication request sent by the terminal device to the second trust domain includes the service identifier or the slice identifier, and the second trust domain generates a second trust credential according to the service identifier/slice identifier, the terminal device identity information, and the second verification information, and sends the second trust credential to the terminal device. The terminal device generates to-be-verified credential information according to the second trust credential and the terminal device identity information. When the terminal device accesses the target resource, the first trust domain verifies the to-be-verified credential information according to the terminal device identity information, the second trust domain identifier, the first verification information, and the service identifier/slice identifier, and if the verification is successful, sends the access request to the second trust domain. The second trust domain verifies the to-be-verified credential information according to the terminal device identity information, the second verification information, and the service identifier/slice identifier.

In some embodiments, to simplify the verification process, on the premise that the first trust collaboration relationship has been established between the first trust domain and the second trust domain, the terminal device only needs to perform access authentication with the first trust domain to acquire the second verification information, and the second trust domain does not need to perform access authentication on the terminal device.

In some embodiments, the first trust domain and the second trust domain are interconnected through a third trust domain. To realize near-source protection against attacks and realize multi-party verification, it is necessary to establish a trust collaboration relationship respectively between the first trust domain and the third trust domain and between the third trust domain and the second trust domain, and generate corresponding second trust credential information.

In some embodiments, the collaborative verification method further includes a third trust domain, and further includes a following step S3000.

At S3000, a second trust collaboration relationship is established with a third trust domain, where the second trust collaboration relationship is used for establishing a third trust collaboration relationship between the second trust domain and the third trust domain.

It should be noted that the third trust domain may be a relay network, the first trust domain establishes a second trust collaboration relationship with the third trust domain, and the second trust domain establish a third trust collaboration relationship with the third trust domain, thus realizing trust transfer through the relay network, and indirectly establishing the first trust collaboration relationship between the first trust domain and the second trust domain.

In some embodiments, the third trust domain sends a trust collaboration request to the first trust domain to establish the second trust collaboration relationship with the first trust domain, where the trust collaboration request sent by the third trust domain includes a third trust domain identifier of the third trust domain (which may be relay identification information of the relay network); and the second trust domain sends a trust collaboration request to the third trust domain to establish the third trust collaboration relationship with the third trust domain, where the trust collaboration request sent by the third trust domain includes a second trust domain identifier of the second trust domain.

The terminal device sends first authentication request information to the first trust domain, and the first trust domain performs access authentication on the terminal device to establish a first trust relationship with the terminal device. The terminal device sends second authentication request information to the second trust domain, and the second trust domain performs access authentication on the terminal device to establish a second trust relationship with the terminal device.

When the terminal device accesses the target resource, the first trust domain, the second trust domain, and the third trust domain respectively verify the access request of the terminal device. In some embodiments, includes the following steps S2100 and S2200.

At S2100, the terminal device is verified according to the first trust collaboration relationship and the second trust collaboration relationship, such that related information verification of the second trust domain is implemented in the first trust domain.

At S2200, the access request is forwarded to the third trust domain, such that related information verification of the second trust domain is implemented in the third trust domain.

It should be noted that the access request includes terminal device identity information, enterprise identifier information, relay identifier information, and to-be-verified credential information, and first to-be-matched credential information is generated according to the access request and the first verification information. In some embodiments, the first trust domain obtains the terminal device identity information, the second trust domain identifier, and the third trust domain identifier according to the access request, generates first to-be-verified information according to the third trust domain identifier and the first verification information, generates second to-be-verified information according to the second trust domain identifier and the first to-be-verified information, generates second trust credential information according to the terminal device identity information and the second to-be-verified information, and generates first to-be-matched credential information according to the terminal device identity information and the second trust credential information. The first trust domain matches the first to-be-matched credential information against the to-be-verified credential information, and if the to-be-verified credential information matches the first to-be-matched credential information, sends the access request to the third trust domain. In this process, according to the third trust domain identifier, the second trust domain identifier, and the first to-be-verified credential information, the related information verification of the second trust domain is implemented in the first trust domain, and the access request is sent to the third trust domain, such that the related information verification of the second trust domain is implemented in the third trust domain. As such, near-source detection of and protection against attacks are achieved, thereby improving the security of the second trust domain. In addition, the amount of data processed by the second trust domain in verifying the terminal device is reduced. Therefore, the data processing burden of the second trust domain in verifying the terminal device is reduced, thereby improving the data processing efficiency of verification by the service side.

The present disclosure further provides a collaborative authentication method, applied to a second trust domain.

Figure 5:
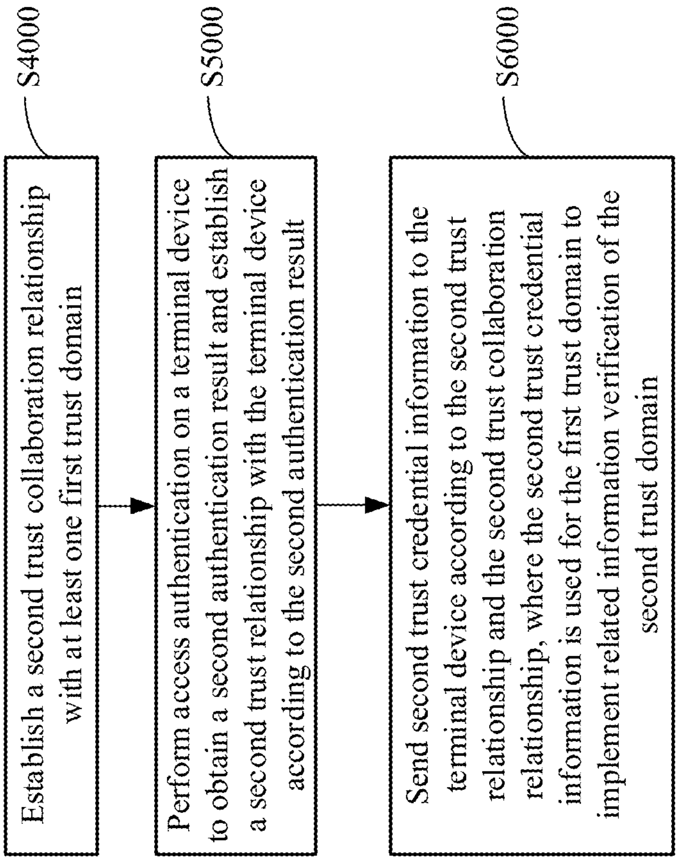
FIG. 5 is a schematic flowchart of a collaborative authentication method according to an embodiment of the present disclosure.

FIG. 5 is a schematic flowchart of a collaborative authentication method according to an embodiment of the present disclosure. As shown in FIG. 5, the collaborative authentication method at least includes the following steps S4000, S5000, and S6000.

At S4000, a second trust collaboration relationship is established with at least one first trust domain.

At S5000, access authentication is performed on a terminal device to obtain a second authentication result and establishing a second trust relationship with the terminal device according to the second authentication result.

At S6000, second trust credential information is sent to the terminal device according to the second trust relationship and the second trust collaboration relationship, where the second trust credential information is used for the first trust domain to implement related information verification of the second trust domain.

It should be noted that in this embodiment, the first trust domain and the second trust domain in this embodiment are not limited to being in an access network and a service network, and may be adjusted according to requirements of the industrial chain. There may be one or more first trust domains. The first trust domain may establish the first trust collaboration relationship with the second trust domain prior to or during the access authentication on the terminal device.

In some embodiments, referring to FIG. 5, the first trust domain may establish the first trust collaboration relationship with the second trust domain prior to the access authentication on the terminal device.

The first trust domain performs trust collaboration authentication with the second trust domain. The second trust domain sends a trust collaboration request to the first trust domain. After determining the trust collaboration relationship with the second trust domain, the first trust domain sends trust collaboration confirmation information to the second trust domain. The second trust domain establishes the first trust collaboration relationship with the first trust domain according to the trust collaboration confirmation information. In some embodiments, the second trust management unit, after being started, sends a trust collaboration request to the first trust management unit; the first trust management unit determines according to a preset trust relationship between the first trust domain and the second trust domain that the first trust domain and the second trust domain can establish a trust collaboration relationship, generates second verification information, and sends collaboration confirmation information including the second verification information to the second trust management unit; and the second trust management unit receives the second verification information and synchronizes the second trust verification information to the second trust authentication unit. The trust collaboration request includes trust domain identification information.

The second trust domain performs access authentication on the terminal device, and if the authentication is successful, sends a second response message to the terminal device. In some embodiments, the terminal device sends second authentication request information to the second trust management unit of the second trust domain, and requests the second trust domain to authenticate the terminal device; and the second trust management unit authenticates the terminal device, generates second trust credential information, and sends a second response message to the terminal device, thus completing the access authentication on the terminal device by the second trust domain, and establishing a second trust relationship between the second trust domain and the terminal device. The terminal device receives the second response message sent by the second trust domain. The second response message includes the second trust credential information and an identifier of the second trust domain. It should be noted that the second trust credential information is generated by the second trust domain.

When the second trust domain verifies the terminal device, the second trust domain verifies the terminal device according to the access request sent by the first trust domain, the second trust relationship, and the second trust collaboration relationship. The first trust domain verifies the access request sent by the terminal device, and when the verification is successful, forwards the access request to the second trust domain, for the second trust domain to verify the access request of the terminal device.

In some embodiments, because the collaboration authentication of the first trust domain and the second trust domain may be performed between the access authentication on the terminal device by the first trust domain and the access authentication on the terminal device by the second trust domain, the second trust domain sends a trust collaboration request to the first trust domain in the process of establishing the first trust collaboration relationship with the second trust domain by the first trust domain, where the trust collaboration request includes related information of the terminal device. According to the trust collaboration request sent by the second trust domain, a preset trust relationship of the second trust domain, and the related information of the terminal device, the first trust domain determines whether the terminal device satisfies an authentication condition. If the terminal device satisfies the authentication condition, the first trust domain queries the related information of the terminal device (e.g., access location information, terminal device type information, and terminal device identity information) according to the preset trust relationship and identity information of the terminal device, generates second verification information, and sends trust collaboration confirmation information to the second trust domain, where the trust collaboration confirmation information includes the identifier of the second trust domain, the related information of the terminal device, the second verification information, etc. The second trust domain receives the trust collaboration confirmation information, and determines according to the related information of the terminal device whether the terminal device satisfies an authentication condition. If the terminal device satisfies the authentication condition, it indicates that a second authentication result of the access authentication on the terminal device by the second trust domain is an authentication success result, and the second trust domain can establish a second trust relationship with the terminal device. If the second authentication result is an authentication failure result, the second trust domain returns an authentication failure message to the terminal device, indicating that the terminal device does not satisfy an access condition of the second trust domain. The second trust domain generates second trust credential information according to the terminal device identity information and the second verification information, and sends a second response message to the terminal device, thus completing the access authentication on the terminal device by the second trust domain, and establishing a second trust relationship between the second trust domain and the terminal device. The terminal device receives the second response message sent by the second trust domain. When the terminal device accesses the target resource, the first trust domain and the second trust domain respectively verify the access request of the terminal device. In this embodiment, the second trust domain determines according to the related information of the terminal device whether to allow the terminal device to access, thereby authenticating the terminal device while establishing a trust relationship between the first trust domain and the second trust domain, and realizing access control of the second trust domain.

In some embodiments, there may be a plurality of first trust domains, and the collaborative authentication method further includes the following steps S7000 to S8000.

At S7000, an authentication request sent by the terminal device is acquired, where the authentication request carries a trust domain identifier.

At S8000, at least one first trust domain corresponding to the trust domain identifier is selected as a target trust domain according to the trust domain identifier, where the target trust domain is a trust domain for verifying the terminal device.

It should be noted that the second trust domain acquires an authentication request sent by the terminal device, where the authentication request includes a trust domain identifier, and the trust domain identifier may be a second trust domain identifier or a third trust domain identifier. The second trust domain selects a corresponding first trust domain according to the trust domain identifier as a target trust domain. The target trust domain verifies the terminal device.

In some embodiments, there may be a plurality of first trust domains, and the collaborative authentication method further includes the following steps S9000 to S10000.

At S9000, an authentication request sent by the terminal device is acquired.

At S10000, an address of the first trust domain is acquired, and the first trust domain is identified according to the address to obtain a target trust domain, where the target trust domain is a trust domain for verifying the terminal device.

It should be noted that the second trust domain acquires an authentication request sent by the terminal device, where the authentication request does not include a trust domain identifier. The second trust domain acquires an address of the first trust domain, and identifies the corresponding first trust domain according to the address of the first trust domain to obtain a target trust domain. The target trust domain verifies the terminal device.

In some embodiments, the collaborative authentication method further includes a third trust domain, and further includes a following step S11000.

At S11000, a fourth trust collaboration relationship is established with a third trust domain according to a third trust collaboration relationship between the first trust domain and the third trust domain, where the fourth trust collaboration relationship is used for implementing related information verification of the second trust domain in the third trust domain.

It should be noted that the first trust domain establishes a third trust collaboration relationship with the third trust domain, and the second trust domain establishes a fourth trust collaboration relationship with the third trust domain according to the third trust collaboration relationship, such that related information verification of the second trust domain is implemented in the third trust domain in the process of verifying the terminal device by the third trust domain. The third trust domain may be a relay network.

The present disclosure further provides a collaborative verification method, applied to a terminal device.

In some embodiments, the terminal device may establish a first trust relationship with a first trust domain and establish a second trust relationship with a second trust domain. The first trust domain establishes a first trust collaboration relationship with the second trust domain. The terminal device accesses a target resource, and sends an access request to the first trust domain. The access request carries information of the terminal device, target resource information, trust domain information, and to-be-verified credential information. The to-be-verified credential information is obtained according to second trust credential information sent by a second trust domain or the first trust domain. The second trust credential information is obtained according to second verification information generated by the first trust domain. The second verification information is generated by the first trust domain after a trust collaboration relationship is established between the first trust domain and the second trust domain. The target resource information includes at least one of: an application identifier, a service identifier, or a slice identifier.

The present disclosure further provides a collaborative verification method, applied to a relay device. The relay network establishes a third trust collaboration relationship with a first trust domain, establishes a fourth trust collaboration relationship with a second trust domain according to the third trust collaboration relationship, and acquires an access request sent by the first trust domain. The access request is forwarded after the third trust domain implements related information verification of the second trust domain. The third trust domain verifies the terminal device according to the second trust collaboration relationship and the access request.

The following examples can illustrate in detail the collaborative verification methods provided by the embodiments of the present disclosure. The following examples describe in detail a process in which the terminal device performs access authentication with the first trust domain, the second trust domain, and the third trust domain, and the first trust domain, the second trust domain, and the third trust domain verify the access request of the terminal device.

An operator network includes a first operator server and a first operator gateway. The second trust domain includes an enterprise network. The enterprise network includes an enterprise server and an enterprise gateway. The third trust domain includes a relay network. The relay network includes a relay server and a relay gateway.

Example One

Figure 6:
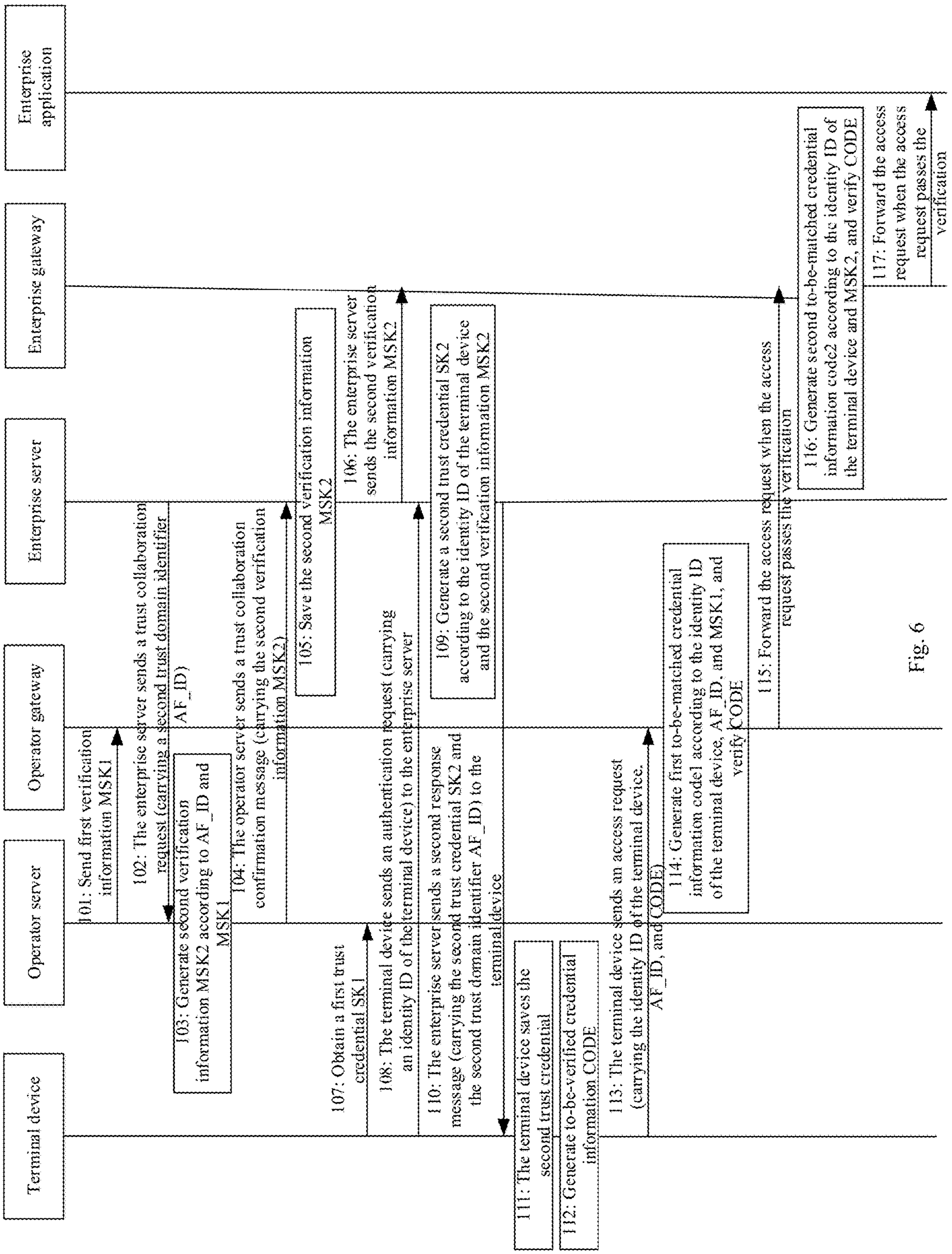
FIG. 6 is a schematic flowchart of a collaborative verification method according to an embodiment of the present disclosure.

FIG. 6 is a schematic flowchart of a collaborative verification method according to an embodiment of the present disclosure.

Steps 101 to 106 are a preparation process before a terminal device accesses an enterprise application.

At step 101, after an operator gateway is started, an operator server sends first verification information MSK1, and the operator gateway obtains the first verification information MSK1 from the operator server.

At step 102, an enterprise server performs a trust negotiation with an operator to which the enterprise server is subscribed. The enterprise server sends a trust collaboration request carrying a second trust domain identifier AF_ID to the operator server.

At step 103, the operator server generates second verification information MSK2 according to the second trust domain identifier AF_ID and the first verification information MSK1.

At step 104, the operator server sends a trust collaboration confirmation message carrying the second verification information MSK2.

At step 105, after receiving the trust collaboration confirmation message, the enterprise server saves the second verification information MSK2.

At step 106, the enterprise server synchronizes the second verification information MSK2 to an enterprise gateway.

At step 107, the terminal device accesses an operator network and performs authentication with the operator server. After the authentication is successful, the terminal device obtains a first trust credential SK1.

At step 108, before accessing the enterprise application, the terminal device sends an authentication request carrying an identity ID of the terminal device (terminal device identity information) to the enterprise server.

At step 109, after successfully authenticating the terminal device, the enterprise server generates a second trust credential SK2 according to the identity ID of the terminal device and the second verification information MSK2.

At step 110, the enterprise server sends a second response message carrying the second trust credential SK2 and the second trust domain identifier AF_ID to the terminal device.

At step 111, the terminal device saves the second trust credential SK2.

At step 112, the terminal device generates to-be-verified credential information CODE according to the identity ID of the terminal device and the second trust credential SK2.

At step 113, the terminal device starts accessing the enterprise application, and sends an access request to a first trust verification unit, where the access request carries the identity ID of the terminal device, the second trust domain identifier AF_ID, and the to-be-verified credential information CODE.

At step 114, after receiving the access request, the operator gateway first calculates first to-be-verified information msk2 according to the second trust domain identifier AF_ID in the access request and locally stored first trust credential MSK1, then calculates second to-be-verified information sk2 according to ID2 and the first to-be-verified information msk2, and finally generates first to-be-matched credential information code1 according to ID2 and the second to-be-verified information sk2. The operator gateway compares whether the first to-be-matched credential information CODE 1 is equal to the to-be-verified credential information CODE in the access request.

At step 115, after determining that the access request passes the verification, the operator gateway forwards the access request to the enterprise gateway. Otherwise, the operator gateway rejects the access request or lowers a priority of the access request.

At step 116, after receiving the access request, the enterprise gateway generates second to-be-matched credential information code2 according to the identity ID of the terminal device in the access request and locally stored second verification information MSK2. The operator gateway compares whether the second to-be-matched credential information code2 is equal to the to-be-verified credential information CODE in the access request.

At step 117, after determining that the access request passes the verification, the enterprise gateway forwards the access request to the enterprise application. Otherwise, the enterprise gateway rejects the access request or lowers a priority of the access request.

Example Two

Figure 7:
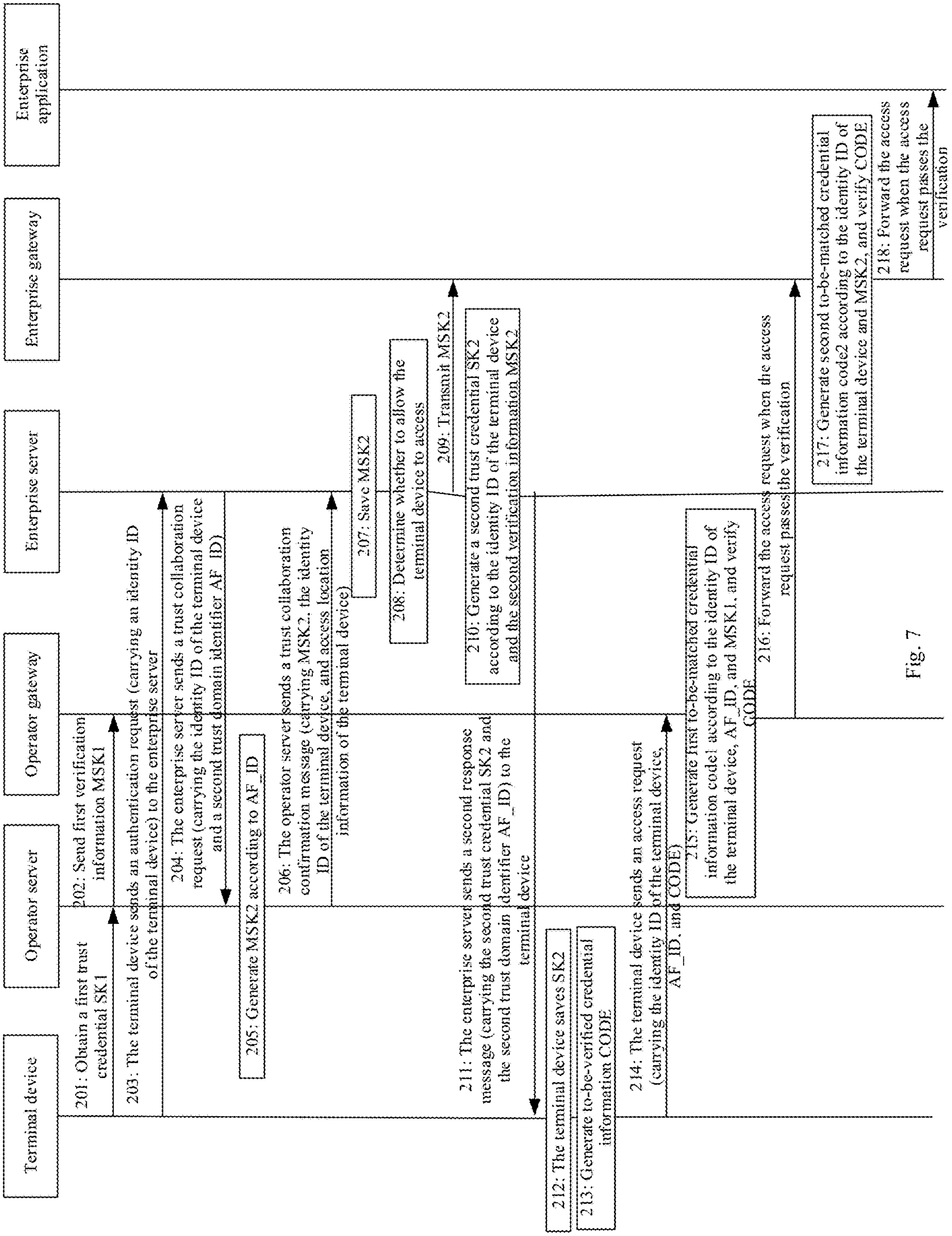
FIG. 7 is a schematic flowchart of a collaborative verification method according to an embodiment of the present disclosure.

FIG. 7 is a schematic flowchart of a collaborative verification method according to an embodiment of the present disclosure.

The collaboration authentication of the first trust domain and the second trust domain may be performed between the access authentication on the terminal device by the first trust domain and the access authentication on the terminal device by the second trust domain.

At step 201, a terminal device requests access authentication from an operator network, and after the authentication is successful, the terminal device obtains a first trust credential SK1.

At step 202, an operator server sends first verification information MSK1 to an operator gateway.

At step 203, the terminal device sends an authentication request carrying an identity ID of the terminal device to an enterprise server.

At step 204, after successfully authenticating the terminal device, the enterprise server sends a trust collaboration request carrying the identity ID of the terminal device and a second trust domain identifier AF_ID to the operator server.

At step 205, the operator server generates second verification information MSK2 according to AF_ID.

At step 206, the operator server sends, to the enterprise server, a trust collaboration confirmation message carrying MSK2 and information such as current access location information and terminal device equipment of the terminal device obtained through query according to the identity ID of the terminal device.

At step 207, the enterprise server stores the generated second verification information MSK2.

At step 208, the enterprise server determines whether to allow the terminal device to access the current service according to the current access location information and the terminal device equipment information of the terminal device. If determining not to allow the terminal device to access the current service, the enterprise server sends an authentication failure message to the terminal device.

At step 209, the enterprise server synchronizes the second verification information to an enterprise gateway.

At step 210, after successfully authenticating the terminal device, the enterprise server generates a second trust credential SK2 according to the identity ID of the terminal device and an enterprise root key.

At step 211, the enterprise server sends an authentication response message carrying SK2 and the second trust domain identifier AF_ID to the terminal device.

At step 212, the terminal device saves the second trust credential SK2.

At step 213, the terminal device generates to-be-verified credential information CODE according to the identity ID of the terminal device and the second trust credential SK2.

At step 214, the terminal device starts accessing the enterprise application, and sends an access request to a first trust verification unit, where the access request carries the identity ID of the terminal device, the second trust domain identifier AF_ID, and the to-be-verified credential information CODE.

At step 215, after receiving the access request, the operator gateway first calculates first to-be-verified information msk2 according to the second trust domain identifier AF_ID in the access request and locally stored first trust credential MSK1, then calculates second to-be-verified information sk2 according to ID2 and the first to-be-verified information msk2, and finally generates first to-be-matched credential information code1 according to ID2 and the second to-be-verified information sk2. The operator gateway compares whether the first to-be-matched credential information CODE 1 is equal to the to-be-verified credential information CODE in the access request.

At step 216, after determining that the access request passes the verification, the operator gateway forwards the access request to the enterprise gateway. Otherwise, the operator gateway rejects the access request or lowers a priority of the access request.

At step 217, after receiving the access request, the enterprise gateway generates second to-be-matched credential information code2 according to the identity ID of the terminal device in the access request and locally stored second verification information MSK2. The operator gateway compares whether the second to-be-matched credential information code2 is equal to the to-be-verified credential information CODE in the access request.

At step 218, after determining that the access request passes the verification, the enterprise gateway forwards the access request to the enterprise application. Otherwise, the operator gateway rejects the access request or lowers a priority of the access request.

Example Three

Figure 8:
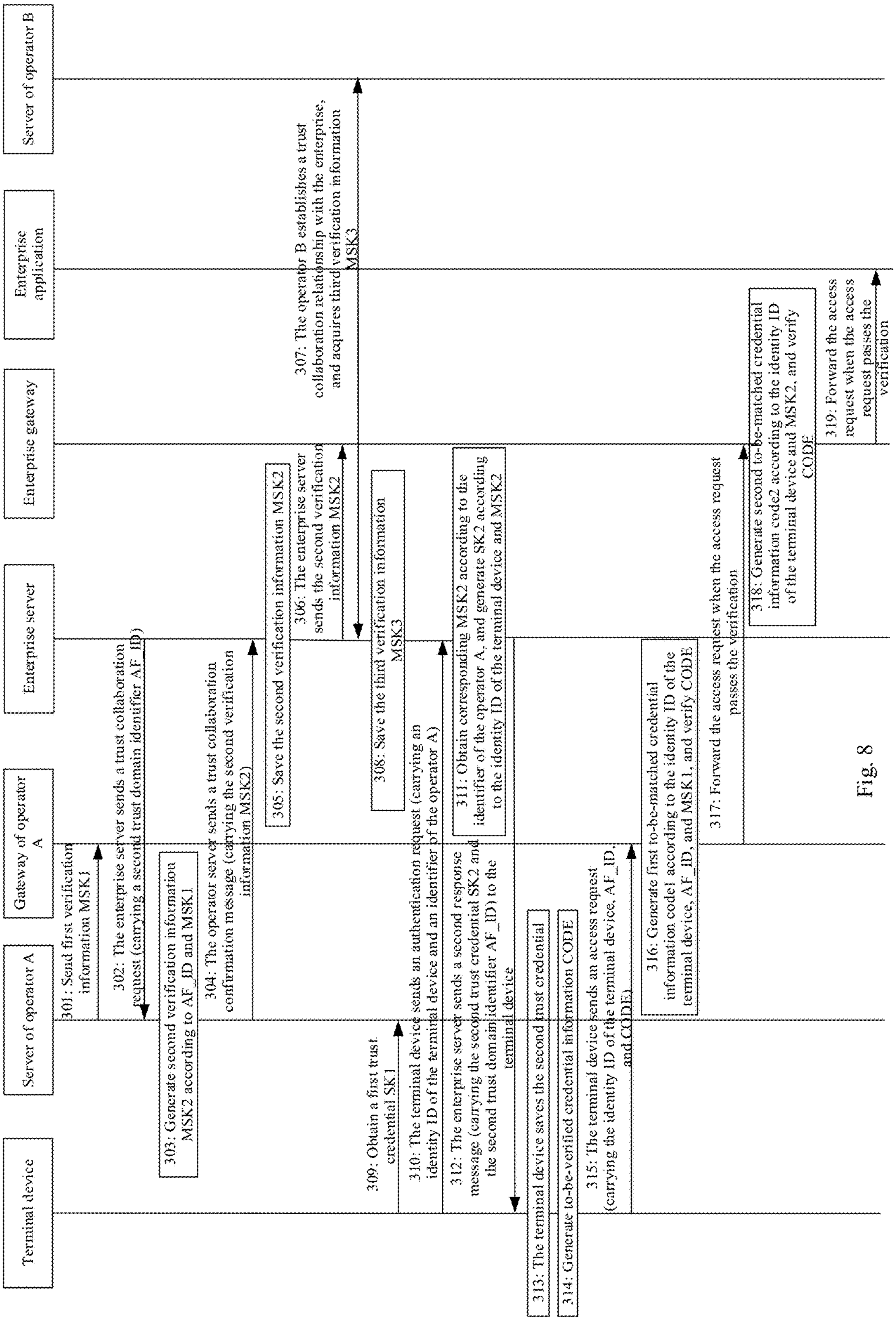
FIG. 8 is a schematic flowchart of a collaborative verification method according to an embodiment of the present disclosure.

FIG. 8 is a schematic flowchart of a collaborative verification method according to an embodiment of the present disclosure.

It should be noted that the first trust domain includes a plurality of operators, and an enterprise server needs to query second verification information of an operator according to a label of the operator.

Steps 301 to 308 are a preparation process before a terminal device accesses an enterprise application.

At step 301, after a gateway of an operator A is started, a server of the operator A sends first verification information MSK1, and the gateway of the operator A obtains the first verification information MSK1 from the server of the operator A.

At step 302, an enterprise server performs a trust negotiation with the operator A to which the enterprise server is subscribed. The enterprise server sends a trust collaboration request carrying a second trust domain identifier AF_ID to the server of the operator A.

At step 303, the server of the operator A generates second verification information MSK2 according to the second trust domain identifier AF_ID and the first verification information MSK1.

At step 304, the server of the operator A sends a trust collaboration confirmation message carrying the second verification information MSK2.

At step 305, after receiving the trust collaboration confirmation message, the enterprise server saves the second verification information MSK2.

At step 306, the enterprise server synchronizes the second verification information MSK2 to an enterprise gateway.

At step 307, the enterprise server performs a trust negotiation with an operator B to which the enterprise server is subscribed, and generates third verification information MSK3.

At step 308, the enterprise server stores the third verification information MSK3.

In the above process, the enterprise server needs to record a correspondence between root keys and operators.

At step 309, the terminal device accesses the network of the operator A and performs authentication with the server of the operator A. After the authentication is successful, the terminal device obtains a first trust credential SK1.

At step 310, before accessing the enterprise application, the terminal device sends an authentication request carrying an identity ID of the terminal device and an identifier of the operator A to the enterprise server.

At step 311, the enterprise server obtains corresponding second verification information through query according to the identifier of the operator A, and generates a second trust credential SK2 according to the identity ID of the terminal device and the second verification information MSK2.

At step 312, the enterprise server sends an authentication response message carrying SK2 and the second trust domain identifier AF_ID to the terminal device.

At step 313, the terminal device saves the second trust credential SK2.

At step 314, the terminal device generates to-be-verified credential information CODE according to the identity ID of the terminal device and the second trust credential SK2.

At step 315, the terminal device starts accessing the enterprise application, and sends an access request to a first trust verification unit, where the access request carries the identity ID of the terminal device, the second trust domain identifier AF_ID, and the to-be-verified credential information CODE.

At step 316, after receiving the access request, the operator gateway first calculates first to-be-verified information msk2 according to the second trust domain identifier AF_ID in the access request and locally stored first trust credential MSK1, then calculates second to-be-verified information sk2 according to ID2 and the first to-be-verified information msk2, and finally generates first to-be-matched credential information code1 according to ID2 and the second to-be-verified information sk2. The operator gateway compares whether the first to-be-matched credential information CODE 1 is equal to the to-be-verified credential information CODE in the access request.

At step 317, after determining that the access request passes the verification, the operator gateway forwards the access request to the enterprise gateway. Otherwise, the operator gateway rejects the access request or lowers a priority of the access request.

At step 318, after receiving the access request, the enterprise gateway generates second to-be-matched credential information code2 according to the identity ID of the terminal device in the access request and locally stored second verification information MSK2. The operator gateway compares whether the second to-be-matched credential information code2 is equal to the to-be-verified credential information CODE in the access request.

At step 319, after determining that the access request passes the verification, the enterprise gateway forwards the access request to the enterprise application. Otherwise, the enterprise gateway rejects the access request or lowers a priority of the access request.

Example Four

Figure 9:
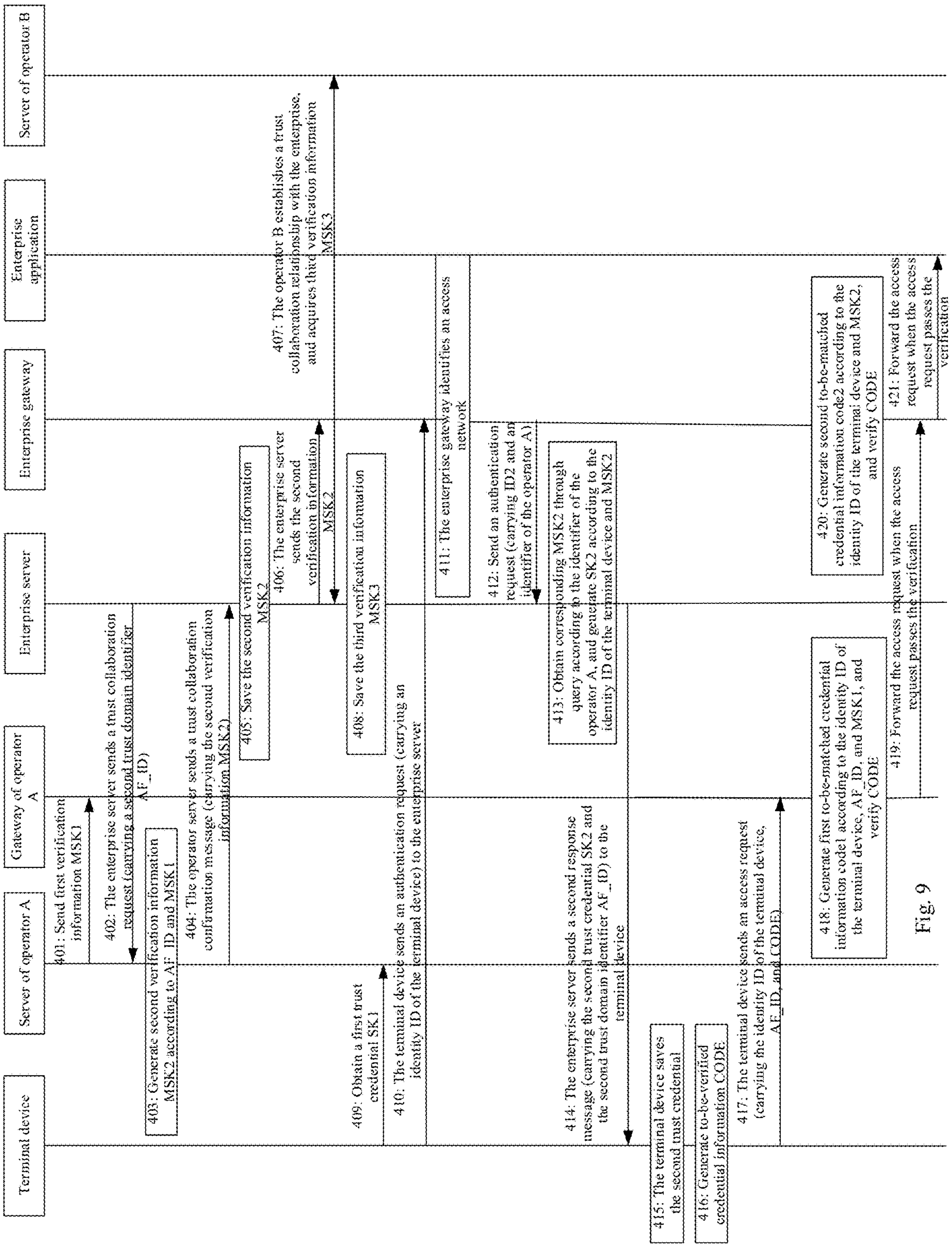
FIG. 9 is a schematic flowchart of a collaborative verification method according to an embodiment of the present disclosure.

FIG. 9 is a schematic flowchart of a collaborative verification method according to an embodiment of the present disclosure.

It should be noted that the first trust domain includes a plurality of operators, an enterprise gateway identifies a network of an operator according to an address of an operator gateway connected to the enterprise gateway, and an enterprise selects different root keys according to an identifier of the operator, and generates a first trust credential for the terminal device.

Steps 401 to 408 are a preparation process before a terminal device accesses an enterprise application.

At step 401, after a gateway of an operator A is started, a server of the operator A sends first verification information MSK1, and the gateway of the operator A obtains the first verification information MSK1 from the server of the operator A.

At step 402, an enterprise server performs a trust negotiation with the operator A to which the enterprise server is subscribed. The enterprise server sends a trust collaboration request carrying a second trust domain identifier AF_ID to the server of the operator A.

At step 403, the server of the operator A generates second verification information MSK2 according to the second trust domain identifier AF_ID and the first verification information MSK1.

At step 404, the server of the operator A sends a trust collaboration confirmation message carrying the second verification information MSK2.

At step 405, after receiving the trust collaboration confirmation message, the enterprise server saves the second verification information MSK2.

At step 406, the enterprise server synchronizes the second verification information MSK2 to an enterprise gateway.

At step 407, the enterprise server performs a trust negotiation with an operator B to which the enterprise server is subscribed, and generates third verification information MSK3.

At step 408, the enterprise server stores the third verification information MSK3.

In the above process, the enterprise server needs to record a correspondence between root keys and operators.

At step 409, the terminal device accesses the network of the operator A and performs authentication with the server of the operator A. After the authentication is successful, the terminal device obtains a first trust credential SK1.

At step 410, before accessing the enterprise application, the terminal device sends an authentication request carrying an identity ID of the terminal device to the enterprise server.

At step 411 and 412, the gateway identifies an access network, i.e., the enterprise gateway identifies the network of the operator A according to an operator gateway address of a previous hop of the authentication request, and adds the identifier of the operator A to the authentication request.

At step 413, the enterprise server obtains corresponding second verification information through query according to the identifier of the operator, and generates a second trust credential SK2 according to the identity ID of the terminal device and the second verification information MSK2.

At step 414, the enterprise server sends an authentication response message carrying SK2 and the second trust domain identifier AF_ID to the terminal device.

At step 415, the terminal device saves the second trust credential SK2.

At step 416, the terminal device generates to-be-verified credential information CODE according to the identity ID of the terminal device and the second trust credential SK2.

At step 417, the terminal device starts accessing the enterprise application, and sends an access request to a first trust verification unit, where the access request carries the identity ID of the terminal device, the second trust domain identifier AF_ID, and the to-be-verified credential information CODE.

At step 418, after receiving the access request, the operator gateway first calculates first to-be-verified information msk2 according to the second trust domain identifier AF_ID in the access request and locally stored first trust credential MSK1, then calculates second to-be-verified information sk2 according to ID2 and the first to-be-verified information msk2, and finally generates first to-be-matched credential information code1 according to ID2 and the second to-be-verified information sk2. The operator gateway compares whether the first to-be-matched credential information CODE 1 is equal to the to-be-verified credential information CODE in the access request.

At step 419, after determining that the access request passes the verification, the operator gateway forwards the access request to the enterprise gateway. Otherwise, the operator gateway rejects the access request or lowers a priority of the access request.

At step 420, after receiving the access request, the enterprise gateway generates second to-be-matched credential information code2 according to the identity ID of the terminal device in the access request and locally stored second verification information MSK2. The operator gateway compares whether the second to-be-matched credential information code2 is equal to the to-be-verified credential information CODE in the access request.

At step 421, after determining that the access request passes the verification, the enterprise gateway forwards the access request to the enterprise application. Otherwise, the enterprise gateway rejects the access request or lowers a priority of the access request.

Example Five

Figure 10:
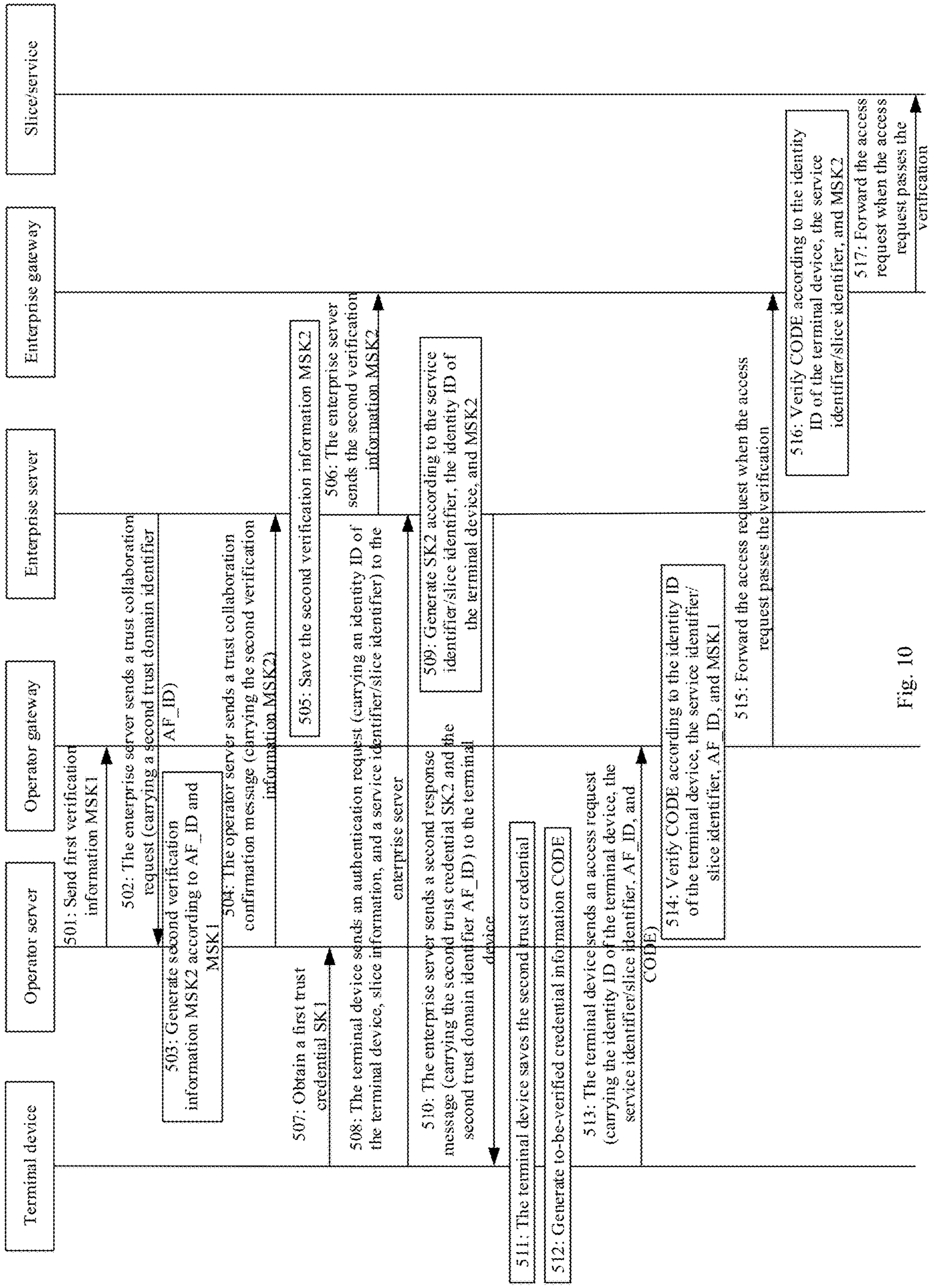
FIG. 10 is a schematic flowchart of a collaborative verification method according to an embodiment of the present disclosure.

FIG. 10 is a schematic flowchart of a collaborative verification method according to an embodiment of the present disclosure.

It should be noted that the second trust domain is an enterprise network, the enterprise network needs to perform verification based on a service identifier or a slice identifier of a service, the terminal device needs to identify a service identifier or a slice identifier in an access request, and the enterprise network performs authentication based on a slice or the service.

Steps 501 to 506 are a preparation process before a terminal device accesses an enterprise application.

At step 501, after an operator gateway is started, an operator server sends first verification information MSK1, and the operator gateway obtains the first verification information MSK1 from the operator server.

At step 502, an enterprise server performs a trust negotiation with an operator to which the enterprise server is subscribed. The enterprise server sends a trust collaboration request carrying a second trust domain identifier AF_ID to the operator server.

At step 503, the operator server generates second verification information MSK2 according to the second trust domain identifier AF_ID and the first verification information MSK1.

At step 504, the operator server sends a trust collaboration confirmation message carrying the second verification information MSK2.

At step 505, after receiving the trust collaboration confirmation message, the enterprise server saves the second verification information MSK2.

At step 506, the enterprise server synchronizes the second verification information MSK2 to an enterprise gateway.

At step 507, the terminal device accesses an operator network and performs authentication with the operator server. After the authentication is successful, the terminal device obtains a first trust credential SK1.

At step 508, before accessing the enterprise application, the terminal device sends an authentication request carrying an identity ID of the terminal device and SliceID or ServiceID (service identifier or slice identifier) of the service to the enterprise server. It should be noted that with the use of the service identifier or the slice identifier, a more refined and customized service can be obtained.

At step 509, after successfully authenticating the terminal device, the enterprise server generates a second trust credential SK2 according to the identity ID of the terminal device, the service identifier or the slice identifier, and the second verification information MSK2.

At step 510, the enterprise server sends an authentication response message carrying SK2 and the second trust domain identifier AF_ID to the terminal device.

At step 511, the terminal device saves the second trust credential SK2.

At step 512, the terminal device generates to-be-verified credential information CODE according to the identity ID of the terminal device and the second trust credential SK2.

At step 513, the terminal device starts to access the enterprise application, and carrying the identity ID of the terminal device, SliceID/ServiceID of the service, the second trust domain identifier AF_ID, and the to-be-verified credential information CODE.

At step 514, after receiving the data packet, the operator gateway first calculates msk2 according to AF_ID in the access request and locally stored MSK1, then calculates sk2 according to ID2, SliceID/ServiceID of the service, and msk2, and finally generates second to-be-matched credential information code1 according to ID2 and sk2. The operator gateway compares whether the local code is equal to the to-be-verified credential information CODE in the access request.

At step 515, after determining that the access request passes the verification, the operator gateway forwards the service request message to the enterprise gateway. Otherwise, the operator gateway rejects the access request or lowers a priority of the access request.

At step 516, after receiving the service request, the enterprise gateway generates second to-be-matched credential information code according to the identity ID of the terminal device and SliceID/ServiceID of the service in the access request and locally stored second verification information MSK2. The operator gateway compares whether the local code is equal to the to-be-verified credential information CODE in the access request.

At step 517, after determining that the access request passes the verification, the enterprise gateway forwards the access request to the enterprise application. Otherwise, the operator gateway rejects the access request or lowers a priority of the access request.

Example Six

Figure 11:
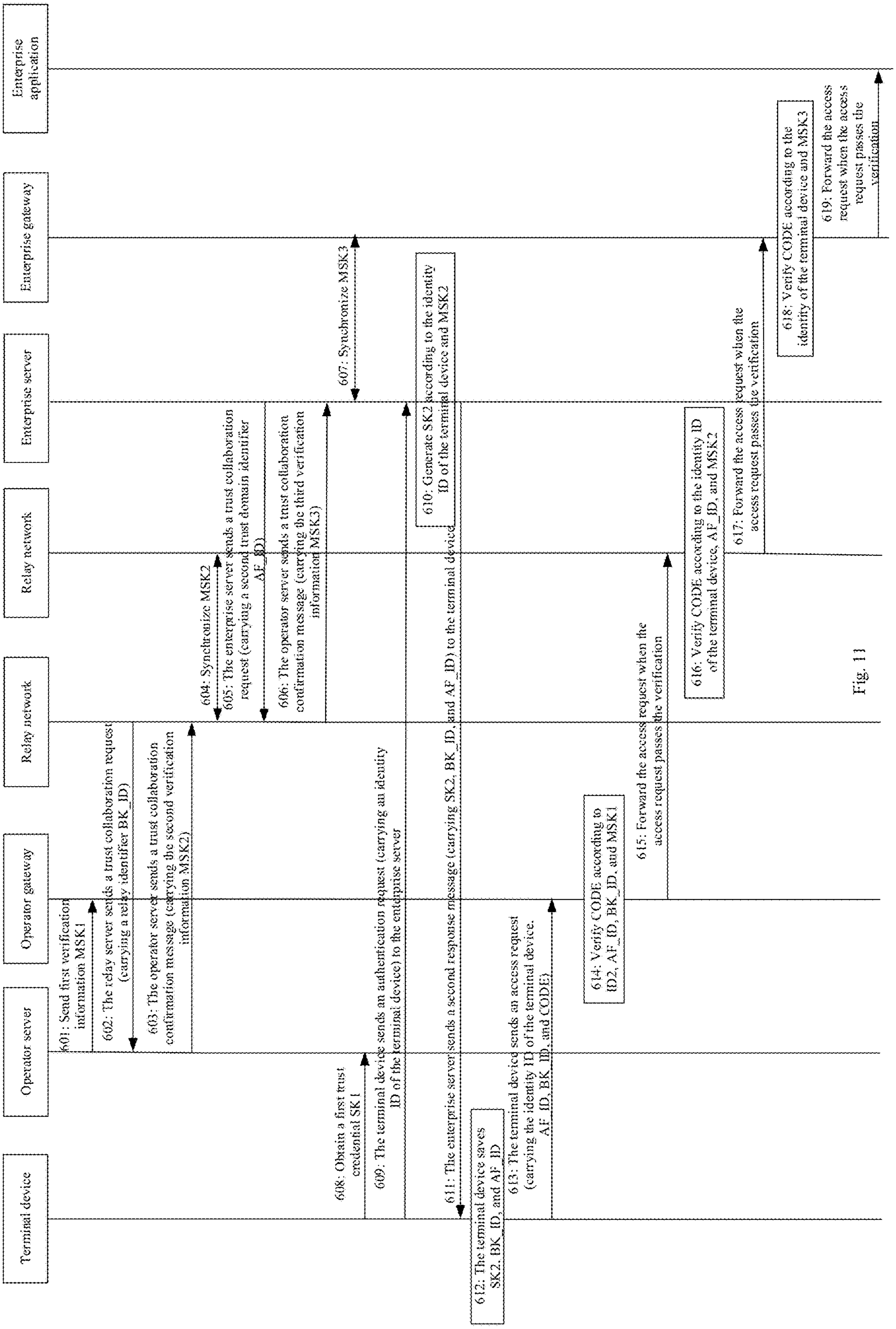
FIG. 11 is a schematic flowchart of a collaborative verification method according to an embodiment of the present disclosure.

FIG. 11 is a schematic flowchart of a collaborative verification method according to an embodiment of the present disclosure.

In some implementation scenarios, an operator network and an enterprise network are interconnected through a relay network. To realize near-source protection against attacks and realize multi-point verification, it is necessary to establish a trust collaboration relationship respectively between the first trust domain and the third trust domain and between the third trust domain and the second trust domain, and generate corresponding second trust credential information.

Steps 601 to 607 are a preparation process before a terminal device accesses an enterprise application.

At step 601, after an operator gateway is started, an operator server sends first verification information MSK1, and the operator gateway obtains the first verification information MSK1 from the operator server.

At step 602, a relay server performs a trust negotiation with the operator. The relay server sends a trust collaboration request carrying a relay identifier BK_ID to the operator server.

At step 603, the operator server generates second verification information MSK2 according to the relay identifier BK_ID and the first verification information MSK1, and sends a trust collaboration confirmation message carrying the second verification information MSK2 to the relay server.

At step 604, the relay server synchronizes the second verification information MSK2 to a relay gateway.

At step 605, the relay server performs a trust negotiation with an enterprise server. The enterprise server sends a trust collaboration request carrying a second trust domain identifier AF_ID to the relay server.

At step 606, the relay server generates third verification information MSK3 according to the second trust domain identifier AF_ID and the second verification information MSK2, and sends a trust collaboration confirmation message carrying the second verification information MSK3 to the enterprise server.

At step 607, the enterprise server synchronizes MSK3 to the enterprise gateway.

At step 608, the terminal device accesses an operator network and performs authentication with the operator server. After the authentication is successful, the terminal device obtains a first trust credential SK1.

At step 609, before accessing the enterprise application, the terminal device sends an authentication request carrying an identity ID of the terminal device to the enterprise server.

At step 610, after successfully authenticating the terminal device, the enterprise server generates a second trust credential SK2 according to the identity ID of the terminal device and the third verification information MSK3.

At step 611, the enterprise server sends an authentication response message carrying SK2, the second trust domain identifier AF_ID, and the relay identifier BK_ID to the terminal device.

At step 612, the terminal device stores the second trust credential SK2, and generates to-be-verified credential information CODE according to the identity ID of the terminal device and the second trust credential SK2.

At step 613, the terminal device starts to access the enterprise application, and sends an authentication request carrying the identity ID of the terminal device, the second trust domain identifier AF_ID, the relay identifier BK_ID, and the to-be-verified credential information CODE.

At step 614, after receiving the authentication request, the operator gateway first calculates first to-be-verified information msk2 according to BK_ID in the access request and locally stored MSK1, then calculates msk3 according to AF_ID and msk2, calculates sk2 according to ID2 and msk3, and finally generates second to-be-matched credential information code according to ID2 and sk2. The operator gateway compares whether the local code is equal to the to-be-verified credential information CODE in the access request.

At step 615, after determining that the access request passes the verification, the operator gateway forwards the access request to the relay gateway. Otherwise, the enterprise gateway rejects the access request or lowers a priority of the access request.

At step 616, after receiving the authentication request, the relay gateway first calculates first to-be-verified information msk3 according to AF_ID in the access request and locally stored MSK2, calculates sk2 according to ID2 and msk3, and finally generates second to-be-matched credential information code according to ID2 and sk2. The operator gateway compares whether the local code is equal to the to-be-verified credential information CODE in the access request.

At step 617, after determining that the access request passes the verification, the relay gateway forwards the access request to the enterprise gateway. Otherwise, the relay gateway rejects the access request or lowers a priority of the access request.

At step 618, after receiving the access request, the enterprise gateway generates second to-be-matched credential information code2 according to the identity ID of the terminal device in the access request and the locally stored enterprise root key MSK3. The operator gateway compares whether the local code is equal to the to-be-verified credential information CODE in the access request.

At step 619, after determining that the access request passes the verification, the enterprise gateway forwards the access request to the enterprise application. Otherwise, the enterprise gateway rejects the access request or lowers a priority of the access request.

Example Seven

Figure 12:
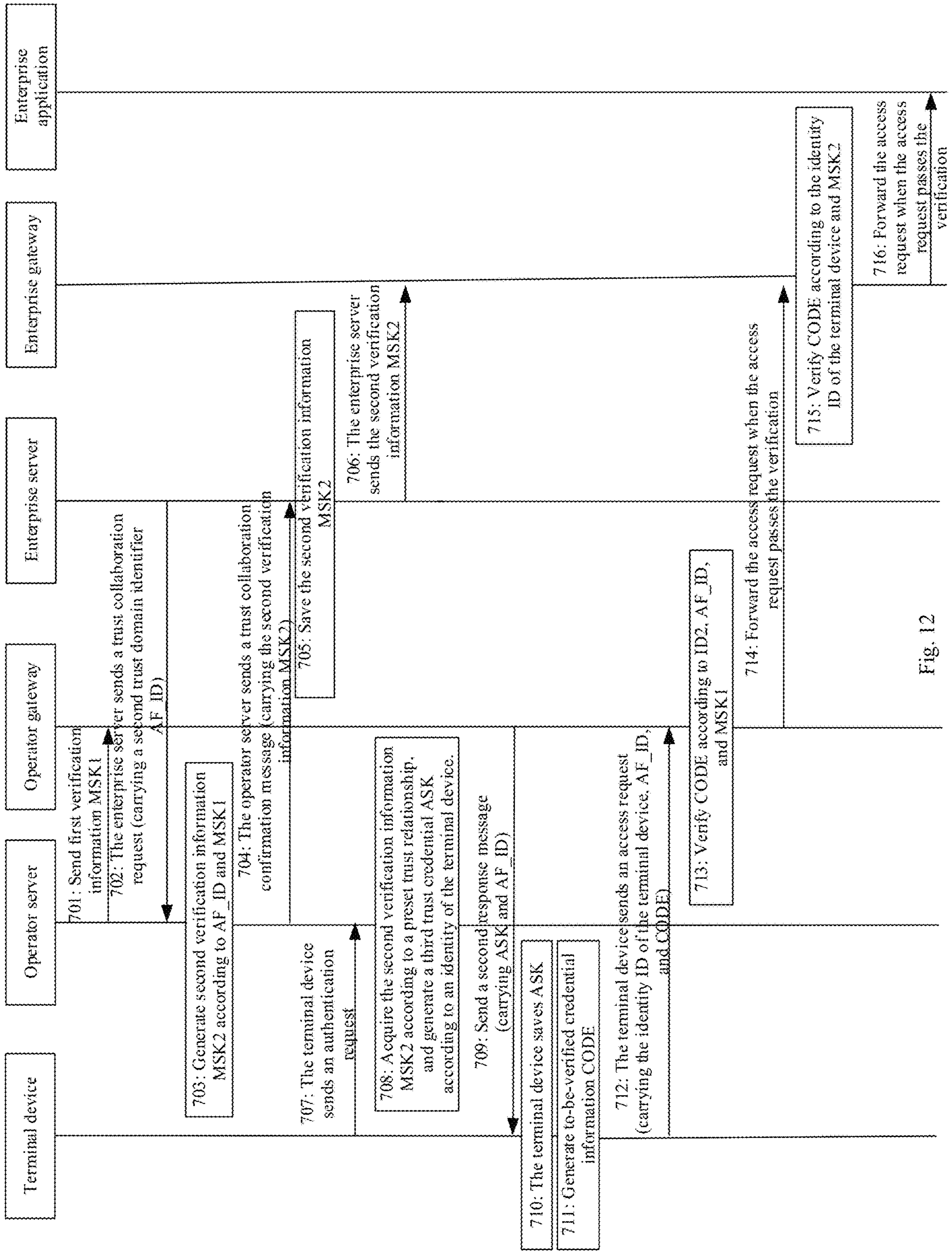
FIG. 12 is a schematic flowchart of a collaborative verification method according to an embodiment of the present disclosure.

FIG. 12 is a schematic flowchart of a collaborative verification method according to an embodiment of the present disclosure.

It should be noted that because a trust collaboration relationship has been established between the enterprise network and the operator network, authentication is performed on the terminal device only once, to acquire a derived enterprise application key.

Steps 701 to 706 are a preparation process before a terminal device accesses an enterprise application.

A process in which the enterprise network and the operator network perform trust collaboration to acquire second verification information derived from the operator is shown in the steps 701 to 706, which are similar to the steps 101 to 106 in Embodiment one.

At step 701, after an operator gateway is started, an operator server sends first verification information MSK1, and the operator gateway obtains the first verification information MSK1 from the operator server.

At step 702, an enterprise server performs a trust negotiation with an operator to which the enterprise server is subscribed. The enterprise server sends a trust collaboration request carrying a second trust domain identifier AF_ID to the operator server.

At step 703, the operator server generates second verification information MSK2 according to the second trust domain identifier AF_ID and the first verification information MSK1.

At step 704, the operator server sends a trust collaboration confirmation message carrying the second verification information MSK2.

At step 705, after receiving the trust collaboration confirmation message, the enterprise server saves the second verification information MSK2.

At step 706, the enterprise server synchronizes the second verification information MSK2 to an enterprise gateway.

At step 707, the terminal device accesses an operator network, sends an authentication request to the terminal, and performs authentication with the operator server.

At step 708, after successfully authenticating the terminal device, the operator server acquires, according to a preset trust relationship, a root key of an enterprise to be accessed, and generates an enterprise session key ASK according to an identity ID of the terminal device.

At step 709, the operator server returns an authentication result carrying the enterprise session key ASK and the second trust domain identifier AF_ID to the terminal device.

At steps 710 to 711, the terminal device stores the enterprise session key ASK, and generates to-be-verified credential information CODE according to the identity ID of the terminal device and ASK.

At step 712, the terminal device starts to access the enterprise application, and carrying the identity ID of the terminal device, the second trust domain identifier AF_ID, and the to-be-verified credential information CODE.

At step 713, after receiving the data packet, the operator gateway first calculates msk2 according to AF_ID in the access request and locally stored MSK1, calculates ASK according to ID and msk2, and finally generates second to-be-matched credential information code according to ID and ASK. The operator gateway compares whether the local code is equal to the to-be-verified credential information CODE in the access request.

At step 714, after determining that the access request passes the verification, the operator gateway forwards the service request message to the enterprise gateway. Otherwise, the operator gateway rejects the access request or lowers a priority of the access request.

At step 715, after receiving the access request, the enterprise gateway generates second to-be-matched credential information code according to the identity ID of the terminal device in the access request and locally stored second verification information MSK2. The operator gateway compares whether the local code is equal to the to-be-verified credential information CODE in the access request.

At step 716, after determining that the access request passes the verification, the enterprise gateway forwards the access request to the enterprise application. Otherwise, the enterprise gateway rejects the access request or lowers a priority of the access request.

An embodiment of the present disclosure provides an operator device, including a memory and a processor. The memory is configured for storing a program which, when read and executed by the processor, causes the processor to implement the collaborative verification method including the steps S1000 to S2000, the steps S1100 to S1600, the step S3000, or the steps S2100 to S2200 in the above embodiments.

An embodiment of the present disclosure provides an enterprise device, including a memory and a processor. The memory is configured for storing a program which, when read and executed by the processor, causes the processor to implement the collaborative authentication method including the steps S4000 to S11000.

An embodiment of the present disclosure provides a terminal device, including a memory and a processor. The memory is configured for storing a program which, when read and executed by the processor, causes the processor to implement the collaborative verification method applied to a terminal device.

An embodiment of the present disclosure provides a relay device, including a memory and a processor. The memory is configured for storing a program which, when read and executed by the processor, causes the processor to implement the collaborative verification method applied to a relay network.

An embodiment of the present disclosure provides a computer storage medium, including a computer program or computer instructions, which when read from the computer-readable storage medium and executed by a processor of a computer device, causes the computer device to implement the collaborative verification method or the collaborative authentication method in the above embodiments.

In the collaborative verification method provided by the embodiments of the present disclosure, a trust collaboration relationship is established between a second trust domain and a first trust domain, the first trust domain and the second trust domain respectively establish a trust relationship with a terminal device to establish a trust transfer mechanism between the terminal device, the first trust domain, and the second trust domain, and when the terminal device accesses a target resource, the first trust domain verifies the terminal device, the first trust domain implements related information verification of the second trust domain and then forwards an access request to the second trust domain, and the second trust domain verifies the terminal device. In this process, the first trust domain implements the related information verification of the second trust domain during verifying the terminal device, to achieve near-source detection of and protection against attacks, thereby improving the security of the second trust domain.

The memory, as a non-transitory computer-readable storage medium, may be configured for storing a non-transitory software program and a non-transitory computer-executable program. In addition, the memory may include a high-speed random access memory, and may also include a non-transitory memory, e.g., at least one magnetic disk storage device, flash memory device, or other non-transitory solid-state storage device. In some implementations, the memory may include memories located remotely from the processor, and the remote memories may be connected to the processor via a network. Examples of the network include, but not limited to, the Internet, an intranet, a local area network, a mobile communication network, and combinations thereof.

The non-transitory software program and instruction required to implement the collaborative verification method of the foregoing embodiments are stored in the memory which, when executed by the processor, causes the processor to implement the collaborative verification method of the foregoing embodiments.

Those having ordinary skills in the art can understand that all or some of the steps in the methods disclosed above and the functional modules/units in the system and the apparatus can be implemented as software, firmware, hardware, and appropriate combinations thereof. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As is known to those having ordinary skills in the art, the term "computer storage medium" includes volatile and nonvolatile, removable and non-removable media implemented in any method or technology for storage of information (such as computer-readable instructions, data structures, program modules, or other data). The computer storage medium includes, but not limited to, a Random Access Memory (RAM), a Read-Only Memory (ROM), an Electrically Erasable Programmable Read-Only Memory (EEPROM), a flash memory or other memory technology, a Compact Disc Read-Only Memory (CD-ROM), a Digital Versatile Disc (DVD) or other optical storage, a cassette, a magnetic tape, a magnetic disk storage or other magnetic storage device, or any other medium which can be used to store the desired information and can be accessed by a computer. In addition, as is known to those having ordinary skills in the art, the communication medium typically includes computer-readable instructions, data structures, program modules, or other data in a modulated data signal such as a carrier or other transport mechanism, and can include any information delivery medium.

In addition, an embodiment of the present disclosure provides a computer program product, including a computer program or computer instructions which, when read from the computer-readable storage medium and executed by a processor of a computer device, causes the computer device to implement the collaborative verification method described above.

Although some embodiments of the present disclosure have been described above, the present disclosure is not limited to the implementations described above. Those having ordinary skills in the art can make various equivalent modifications or replacements without departing from the essence of the present disclosure. Such equivalent modifications or replacements fall within the scope defined by the claims of the present disclosure.

What is claimed is:

1. A collaborative verification method, performed by a first trust domain, the collaborative verification method comprising:

establishing a first trust collaboration relationship with a second trust domain; and acquiring an access request sent by a terminal device, and performing access verification on the terminal device according to the first trust collaboration relationship and the access request, such that related information verification of the second trust domain is implemented in the first trust domain;

wherein establishing the first trust collaboration relationship with the second trust domain comprises:

receiving a trust collaboration request sent by the second trust domain, wherein the trust collaboration request comprises related information of the terminal device;

obtaining a trust collaboration result according to a preset trust relationship and the trust collaboration request; and sending trust collaboration confirmation information to the second trust domain according to the trust collaboration result, wherein the trust collaboration confirmation information comprises the related information of the terminal device and second verification information;

wherein the second verification information is used for generating second trust credential information, the second trust credential information is used for the terminal device to generate to-be-verified credential information, and the to-be-verified credential information is used for the first trust domain to implement the related information verification of the second trust domain.

2. The collaborative verification method of claim 1, wherein the second trust credential information is generated by at least one of the first trust domain and the second trust domain.

3. The collaborative verification method of claim 1, wherein the collaborative verification method further comprises:

establishing a second trust collaboration relationship with a third trust domain, wherein the second trust collaboration relationship is used for establishing a third trust collaboration relationship between the second trust domain and the third trust domain.

4. The collaborative verification method of claim 3, wherein performing access verification on the terminal device according to the first trust collaboration relationship and the access request, such that related information verification of the second trust domain is implemented in the first trust domain comprises:

verifying the terminal device according to the first trust collaboration relationship and the second trust collaboration relationship, such that related information verification of the second trust domain is implemented in the first trust domain; and forwarding the access request to the third trust domain, such that related information verification of the second trust domain is implemented in the third trust domain.

5. A collaborative authentication method, performed by a second trust domain, the collaborative authentication method comprising:

establishing a second trust collaboration relationship with at least one first trust domain;

performing access authentication on a terminal device to obtain a second authentication result and establishing a second trust relationship with the terminal device according to the second authentication result; and sending second trust credential information to the terminal device according to the second trust relationship and the second trust collaboration relationship, wherein the second trust credential information is used for the first trust domain to implement related information verification of the second trust domain;

wherein establishing the second trust collaboration relationship with the at least one first trust domain comprises:

sending a trust collaboration request to the at least one first trust domain; and receiving trust collaboration confirmation information sent by the at least one first trust domain, wherein the trust collaboration confirmation information comprises second verification information, and the second verification information is used for generating the second trust credential information, the second trust credential information is used for the terminal device to generate to-be-verified credential information, and the to-be-verified credential information is used for the first trust domain to implement the related information verification of the second trust domain;

wherein the trust collaboration confirmation information further comprises related information of the terminal device; and performing access authentication on the terminal device to obtain the second authentication result and establishing the second trust relationship with the terminal device according to the second authentication result comprises:

determining according to the related information of the terminal device whether the terminal device satisfies an authentication condition; and in response to the terminal device satisfying the authentication condition, determining that the second authentication result is an authentication success result, and establishing the second trust relationship with the terminal device.

6. The collaborative authentication method of claim 5, wherein performing access authentication on a terminal device comprises:

acquiring an authentication request sent by the terminal device, wherein the authentication request carries a trust domain identifier; and selecting, according to the trust domain identifier, at least one first trust domain corresponding to the trust domain identifier as a target trust domain, wherein the target trust domain is a trust domain for verifying the terminal device.

7. The collaborative authentication method of claim 5, wherein a second trust collaboration relationship with a plurality of first trust domains is established; and performing access authentication on a terminal device comprises:

acquiring an authentication request sent by the terminal device; and acquiring a previous hop address of the authentication request, identifying a target trust domain from the plurality of first trust domains according to the previous hop address, wherein the target trust domain is a trust domain for verifying the terminal device.

8. The collaborative authentication method of claim 5, wherein the collaborative authentication method further comprises:

establishing a fourth trust collaboration relationship with a third trust domain according to a third trust collaboration relationship between the first trust domain and the third trust domain, wherein the fourth trust collaboration relationship is used for implementing related information verification of the second trust domain in the third trust domain.

9. A collaborative verification method, performed by a terminal device, the collaborative verification method comprising:

sending an access request to a first trust domain, wherein the access request carries information of the terminal device, target resource information, trust domain information, and to-be-verified credential information, wherein the to-be-verified credential information is obtained according to second trust credential information sent by a second trust domain or the first trust domain, the second trust credential information is obtained according to second verification information generated by the first trust domain, and the second verification information is generated by the first trust domain after a trust collaboration relationship is established between the first trust domain and the second trust domain;

wherein the second verification information is comprised in trust collaboration confirmation information sent by the first trust domain to the second trust domain, and the trust collaboration confirmation information further comprises related information of the terminal device; and wherein the second trust credential information is used for the terminal device to generate the to-be-verified credential information, and the to-be-verified credential information is used for the first trust domain to implement related information verification of the second trust domain.

10. The collaborative verification method of claim 9, wherein the target resource information comprises at least one of:

an application identifier, a service identifier, or a slice identifier.

* * * * *